United States Patent
Takeshima et al.

(10) Patent No.: US 10,521,625 B2
(45) Date of Patent: Dec. 31, 2019

(54) SAFETY CONTROL DEVICE, METHOD OF CONTROLLING SAFETY CONTROL DEVICE, AND RECORDING MEDIUM

(71) Applicant: OMRON Corporation, Kyoto (JP)

(72) Inventors: Masatoshi Takeshima, Kusatsu (JP); Yoshiharu Tani, Kusatsu (JP); Kazunori Osako, Otsu (JP); Toshiyuki Higuchi, Kusatsu (JP); Minoru Hashimoto, Ritto (JP); Daichi Kamisono, Kusatsu (JP); Tetsuya Akagi, Kyoto (JP)

(73) Assignee: OMRON Corporation, Kyoto (JP)

( * ) Notice: Subject to any disclaimer, the term of this patent is extended or adjusted under 35 U.S.C. 154(b) by 6 days.

(21) Appl. No.: 15/893,708

(22) Filed: Feb. 12, 2018

(65) Prior Publication Data

US 2018/0349654 A1 Dec. 6, 2018

(30) Foreign Application Priority Data

Jun. 1, 2017 (JP) .................... 2017-109255

(51) Int. Cl.
| | | |
|---|---|---|
| *G05B 19/406* | (2006.01) | |
| *B25J 19/06* | (2006.01) | |
| *G08B 13/183* | (2006.01) | |
| *G08B 13/24* | (2006.01) | |
| *G08B 21/02* | (2006.01) | |
| *G08B 25/08* | (2006.01) | |
| *G06K 7/10* | (2006.01) | |
| *B25J 9/16* | (2006.01) | |

(Continued)

(52) U.S. Cl.
CPC ........ *G06K 7/10366* (2013.01); *B25J 9/1676* (2013.01); *B25J 19/06* (2013.01); *F16P 3/142* (2013.01); *G05B 19/406* (2013.01); *G08B 13/183* (2013.01); *G08B 13/24* (2013.01); *G08B 21/02* (2013.01); *G08B 25/08* (2013.01); *H04N 5/247* (2013.01); *G05B 2219/50193* (2013.01); *H04N 13/204* (2018.05)

(58) Field of Classification Search
CPC ........ G05B 19/406; G05B 2219/50193; B25H 7/045; B66C 13/06; B66C 13/46; G01S 5/14
USPC .................................... 700/28, 228
See application file for complete search history.

(56) References Cited

U.S. PATENT DOCUMENTS

| | | | |
|---|---|---|---|
| 2015/0049911 A1 | 2/2015 | Doettling et al. | |
| 2015/0265920 A1* | 9/2015 | Kim ................... | A63F 13/49 463/31 |
| 2018/0322755 A1* | 11/2018 | Staszel ................ | G08B 21/02 |

FOREIGN PATENT DOCUMENTS

| | | |
|---|---|---|
| DE | 102016120559 | 5/2017 |
| EP | 1911553 | 4/2008 |

(Continued)

OTHER PUBLICATIONS

"Search Report of Europe Counterpart Application", dated Sep. 12, 2018, p. 1-p. 8.

*Primary Examiner* — Michael J Brown
(74) *Attorney, Agent, or Firm* — JCIPRNET

(57) ABSTRACT

A safety control device, a method of controlling safety control device, and a recording medium are provided. A detection zone in which the safety of an operator can be secured and a decrease in an operation rate of a machine can be minimized is set. A safety controller sets a detection zone for executing a safety operation when it is determined that an operator has entered for each operator.

20 Claims, 8 Drawing Sheets

(51) Int. Cl.
*F16P 3/14* (2006.01)
*H04N 5/247* (2006.01)
G06F 16/9537 (2019.01)
B66C 13/06 (2006.01)
G01S 5/14 (2006.01)
H04N 13/204 (2018.01)

(56) References Cited

FOREIGN PATENT DOCUMENTS

| | | |
|---|---|---|
| GB | 2462590 | 2/2010 |
| JP | 2007061924 | 3/2007 |

\* cited by examiner

FIG. 3(A) — 210

| SKILL LEVEL | DETECTION ZONE |
|---|---|
| EXPERT | 0.5m |
| BEGINNER | 1.0m |
| NO SETTING | 1.5m |

FIG. 3(B) — 220

| OPERATOR ID | OPERATOR NAME | SKILL LEVEL |
|---|---|---|
| ID01 | TARO TOKYO | EXPERT |
| ID02 | JIRO TOKYO | BEGINNER |
| ID03 | SABURO TOKYO | BEGINNER |
| ... | ... | ... |

FIG. 3(C) — 230

| OPERATOR ID | DETECTION ZONE |
|---|---|
| ID01 | DZ01 |
| ID02 | DZ02 |
| NOTHING (ID101) | DZ101 |

FIG. 3(D) — 240

| OPERATOR ID | CURRENT POSITION INFORMATION |
|---|---|
| ID01 | CP01 |
| ID02 | CP02 |
| NOTHING (ID101) | CP101 |

SAFETY CONTROL DEVICE, METHOD OF CONTROLLING SAFETY CONTROL DEVICE, AND RECORDING MEDIUM

CROSS-REFERENCE TO RELATED APPLICATION

This application claims the priority benefit of Japanese application serial no. 2017-109255, filed on Jun. 1, 2017. The entirety of the above-mentioned patent application is hereby incorporated by reference herein and made a part of this specification.

BACKGROUND

Technical Field

The disclosure relates to a safety control device and the like for securing safety of an operator in a dangerous region including a region where an operation space of a machine overlaps an operation space of the operator.

Description of Related Art

Conventionally, a safety control device configured to execute a safety operation when it is determined that an operator is present within a detection zone in a dangerous region including a region where an operation space of a machine overlaps an operation space of the operator is known. Patent Document 1 listed below discloses a robot control device configured to control driving of a robot in consideration of a position of an operator.

PATENT DOCUMENTS

[Patent Document 1] Japanese Patent Application Laid-Open (JP-A) No. 2007-61924 (published on Mar. 15, 2007)

However, the conventional technology as described above has a problem in that it is difficult to set an optimum detection zone for minimizing a decrease in an operation rate of a machine while securing safety of each operator who performs an operation in the above-described dangerous region.

SUMMARY

An embodiment of the disclosure is to set an optimum detection zone for minimizing a decrease in an operation rate of a machine while securing safety of each operator who performs an operation in a dangerous region including a region where an operation space of a machine overlaps an operation space of an operator.

According to an embodiment of the disclosure, there is provided a safety control device for executing a safety operation when it is determined that an operator has entered a detection zone in a dangerous region including a region where an operation space of a machine overlaps an operation space of the operator, the safety control device including: an acquisition unit configured to acquire identification information of each of a plurality of operators simultaneously present within the dangerous region; a setting unit configured to set the detection zone for each operator whose identification information is acquired by the acquisition unit; and a position identification unit configured to identify a position of each of the plurality of operators whose identification information is acquired by the acquisition unit in the dangerous region, wherein the safety operation is executed when at least one of the plurality of operators whose identification information is acquired by the acquisition unit enters the detection zone set for the at least one operator by the setting unit.

According to the disclosure, there is provided a method of controlling a safety control device for executing a safety operation when it is determined that an operator has entered a detection zone in a dangerous region including a region where an operation space of a machine overlaps an operation space of the operator, the method including: an acquisition step of acquiring identification information of each of a plurality of operators simultaneously present within the dangerous region; a setting step of setting the detection zone for each operator whose identification information is acquired in the acquisition step; and a position identification step of identifying a position of each of the plurality of operators whose identification information is acquired in the acquisition step in the dangerous region, wherein the safety operation is executed when at least one of the plurality of operators whose identification information is acquired in the acquisition step enters the detection zone set for the at least one operator in the setting step.

BRIEF DESCRIPTION OF THE DRAWINGS

FIG. 3(A), FIG. 3(B), FIG. 3(C) and FIG. 3(D) are diagrams illustrating an example of a data structure of various types of information stored in a storage unit of the safety controller of FIG. 1.

DESCRIPTION OF THE EMBODIMENTS

Figure 1:
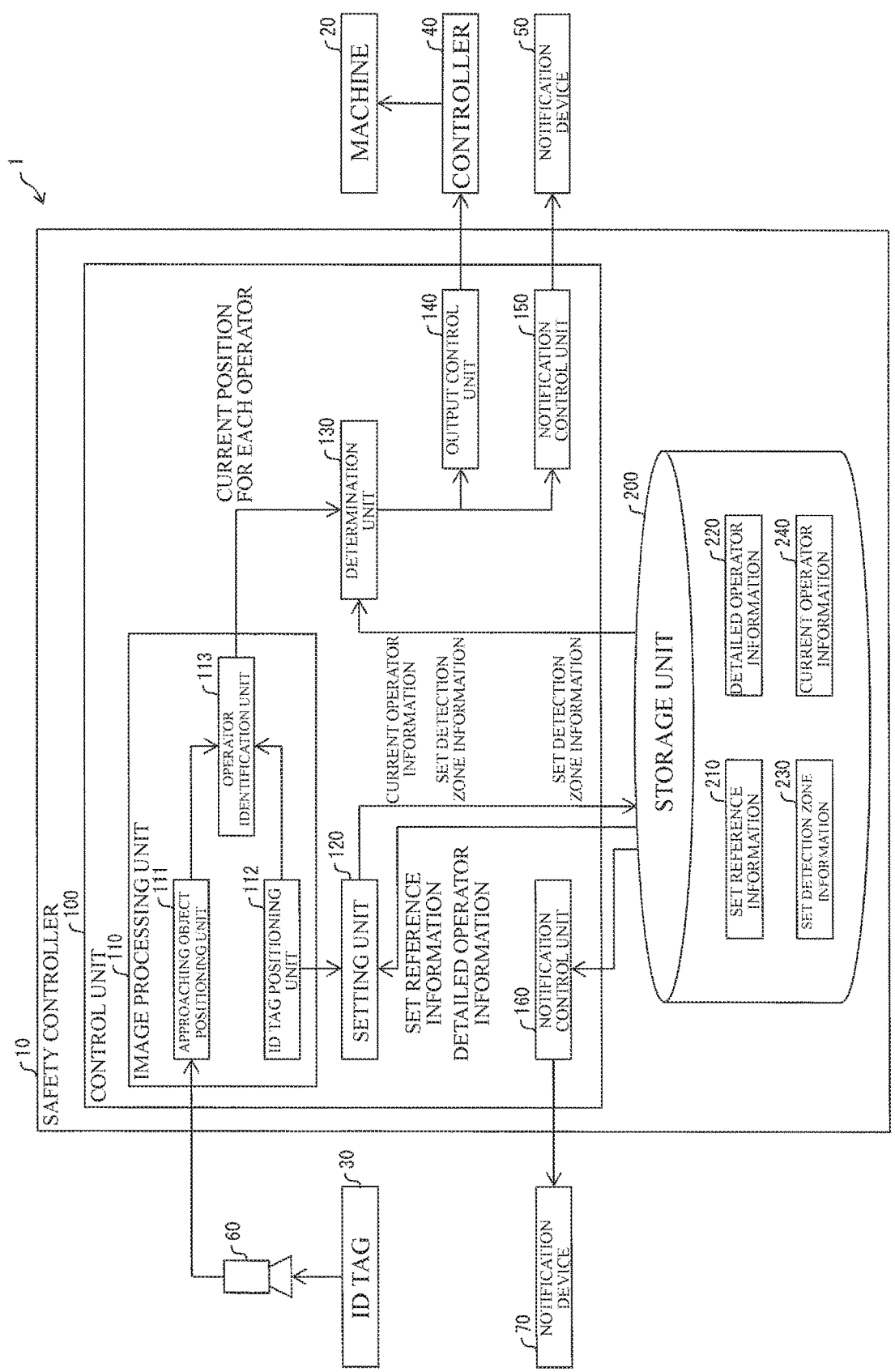
FIG. 1 is a block diagram illustrating a configuration of main parts of a safety controller according to embodiment 1 of the disclosure.

An embodiment of the disclosure is to set an optimum detection zone for minimizing a decrease in an operation rate of a machine while securing safety of each operator who performs an operation in a dangerous region including a region where an operation space of a machine overlaps an operation space of an operator.

According to an embodiment of the disclosure, there is provided a safety control device for executing a safety operation when it is determined that an operator has entered a detection zone in a dangerous region including a region where an operation space of a machine overlaps an operation space of the operator, the safety control device including: an acquisition unit configured to acquire identification information of each of a plurality of operators simultaneously present within the dangerous region; a setting unit configured to set the detection zone for each operator whose identification information is acquired by the acquisition unit; and a position identification unit configured to identify a position of each of the plurality of operators whose identification information is acquired by the acquisition unit in the dangerous region, wherein the safety operation is executed when at least one of the plurality of operators whose identification information is acquired by the acquisition unit enters the detection zone set for the at least one operator by the setting unit.

According to the above-described configuration, the safety control device sets the detection zone for each operator and executes the safety operation when at least one of the plurality of operators enters the detection zone set for the at least one operator. For example, the safety control device sets detection zones DZ01, DZ02, and DZ101 for three operators P01, P02, and P101. Then, when at least one (e.g., the operator P02) of the three operators P01, P02, and P101 enters the detection zone (e.g., the detection zone DZ02) set for the operator by the safety control device, the safety control device executes the safety operation.

Here, for example, characteristics such as knowledge of an operation of a machine, details of an assigned operation, a skill level of an operation, a body shape, and the like vary according to each operator. According to these characteristics, it can be assumed that the "distance from the machine (i.e., the detection zone)" necessary for performing the operation while sufficiently securing safety also varies. Specifically, an operator who is familiar with the operation of the machine and has a high skill level of the operation can perform the operation while sufficiently securing safety even if a distance from the machine is somewhat short. On the other hand, an operator who does not have sufficient knowledge of the operation of the machine and is unfamiliar with the operation is considered to need to be farther from the machine in order to perform the operation while sufficiently securing safety.

Conventionally, the above-described characteristics of each operator who performs an operation are not considered with respect to a detection zone for securing the safety of the operator (i.e., a distance from the machine) in the dangerous region where the operation space of the machine overlaps the operation space of the operator. Specifically, a detection zone corresponding to "the distance from the machine" for securing safety to the utmost is set so that any operator can perform an operation while sufficiently securing safety regardless of the above-described characteristics of each operator who performs an operation conventionally. In other words, the conventional safety control device executes a safety operation even when "an operator who is familiar with the operation of the machine and has a high skill level of the operation" enters the detection zone for securing the safety of "an operator who does not have sufficient knowledge of the operation of the machine and is unfamiliar with the operation." Thus, there is a problem in that the conventional safety control device causes the machine to be paused and causes an operation rate of the machine to be decreased frequently.

According to the above-described configuration, the safety control device identifies each of the plurality of operators and sets the above-described detection zone for each operator. The safety control device identifies a position of each of the plurality of operators simultaneously present within the dangerous region and executes the safety operation when a certain operator enters the detection zone set for the certain operator.

For example, the safety control device sets different detection zones for "an operator who is familiar with the operation of the machine and has a high skill level of the operation" and "an operator who does not have sufficient knowledge of the operation of the machine and is unfamiliar with the operation." Thus, the safety control device does not execute a safety operation when "an operator who is familiar with the operation of the machine and has a high skill level of the operation" enters the detection zone for securing the safety of "an operator who does not have sufficient knowledge of the operation of the machine and is unfamiliar with the operation." That is, because the safety control device executes a safety operation (e.g., pauses the machine) only when it is necessary to secure the safety of the specific operator, a decrease in the operation rate of the machine can be minimized.

Therefore, the safety control device can set an optimum detection zone for minimizing a decrease in an operation rate of a machine while securing safety of each operator with respect to a plurality of operators. In other words, the safety control device can execute an optimum safety operation for each operator and minimize a decrease in an operation rate of the machine even when a plurality of operators having different characteristics such as knowledge of an operation of a machine, details of an assigned operation, a skill level of an operation, and a body shape are simultaneously present within the dangerous region.

In the safety control device according to the disclosure, the acquisition unit may acquire the identification information of the operator within the dangerous region by using at least one of an image obtained by photographing the dangerous region and a signal from a wireless tag storing the identification information of the operator that is a wireless tag carried by the operator.

According to the above-described configuration, the safety control device acquires the identification information of the operator within the dangerous region by using at least one of an image obtained by photographing the dangerous region and a signal from a wireless tag storing the identification information of the operator that is a wireless tag carried by the operator.

Here, for the purpose of managing a human entering the dangerous region or the like, it is conventional to carry a wireless tag storing identification information of the human or the like. Therefore, because the safety control device can easily acquire the identification information of the operator from such a wireless tag, the additional cost for implementing the safety management using the safety control device can be minimized.

Also, for the purpose of monitoring a dangerous region or the like, it is conventional to photograph the dangerous region in which the operator performs an operation. Therefore, because the safety control device can easily acquire identification information of the operator from an image obtained by photographing the dangerous region, the additional cost for implementing the safety management using the safety control device can be minimized.

Therefore, the safety control device can easily acquire the identification information of the operator within the dangerous region with the low implementation cost by using at least one of the image and the signal from the wireless tag.

According to the disclosure, the safety control device may further include notification unit configured to notify the operator having entered the detection zone that the operator has entered the detection zone set for the operator when the operator whose identification information is acquired by the acquisition unit has entered the detection zone set for the operator by the setting unit.

According to the above-described configuration, the safety control device notifies the operator having entered the detection zone that the operator has entered the detection zone set for the operator when the operator whose identification information is acquired by the acquisition unit has entered the detection zone set for the operator by the setting unit.

As described above, the safety control device sets the detection zone for each operator and executes the optimum safety operation for each operator. For example, if the safety operation is executed in a state in which a plurality of operators are simultaneously present within the dangerous zone, it may be difficult to ascertain an operator who has caused the execution of the safety operation because the detection zone is set for each operator.

In order to avoid such a situation, when a certain operator has entered the detection zone set for the certain operator, the safety control device notifies the certain operator that the certain operator has entered the detection zone set for the certain operator.

Therefore, for example, the safety control device can provide a notification indicating an operator who has caused the execution of the safety operation to the operator who is the cause thereof even when the safety operation is executed in a state in which a plurality of operators are simultaneously present in the dangerous region.

According to the disclosure, the safety control device may further include a notification unit configured to notify the operator whose identification information is acquired by the acquisition unit of the detection zone set for the operator by the setting unit.

According to the above-described configuration, the safety control device notifies the operator whose identification information is acquired by the acquisition unit of the detection zone set for the operator by the setting unit.

As described above, because the safety control device sets the detection zone for each operator, it may be difficult for an operator to ascertain the detection zone specific to him/her.

In order to avoid this state, the safety control device notifies a certain operator of the detection zone set for the certain operator.

Therefore, a notification of the detection zone set for each operator can be provided by the safety control device for each operator.

In the safety control device according to the disclosure, the notification unit may cause a wearable display terminal worn by the operator to display the detection zone set for the operator by the setting unit and the acquisition unit may acquire the identification information of the operator from a tag in which the identification information of the operator is described that is a tag provided in the wearable display terminal.

According to the above-described configuration, the safety control device causes the wearable display terminal worn by the operator to display the detection zone set for the operator and acquires identification information of the operator from a tag provided in the wearable display terminal.

Therefore, the safety control device can provide a notification of the detection zone set for each operator by causing the wearable display terminal worn by the operator to display the detection zone for each operator.

Also, the safety control device can acquire the identification information of the operator from the tag provided in the wearable display terminal worn by the operator.

In the safety control device according to the disclosure, the setting unit may set a three-dimensional detection zone by using a captured image of the dangerous region photographed by at least two cameras.

According to the above-described configuration, the safety control device sets a three-dimensional detection zone by using a captured image of the dangerous region photographed by at least two cameras.

Therefore, the safety control device can set a three-dimensional detection zone in consideration of a body shape (e.g., a height or the like) or the like of the operator and execute an optimum safety operation for each operator.

According to the disclosure, there is provided a method of controlling a safety control device for executing a safety operation when it is determined that an operator has entered a detection zone in a dangerous region including a region where an operation space of a machine overlaps an operation space of the operator, the method including: an acquisition step of acquiring identification information of each of a plurality of operators simultaneously present within the dangerous region; a setting step of setting the detection zone for each operator whose identification information is acquired in the acquisition step; and a position identification step of identifying a position of each of the plurality of operators whose identification information is acquired in the acquisition step in the dangerous region, wherein the safety operation is executed when at least one of the plurality of operators whose identification information is acquired in the acquisition step enters the detection zone set for the at least one operator in the setting step.

According to the above-described method, in the control method, the detection zone is set for each operator and the safety operation is executed when at least one of the plurality of operators enters the detection zone set for the at least one operator. For example, in the control method, detection zones DZ01, DZ02, and DZ101 are set for three operators P01, P02, and P101. Then, when at least one (e.g., the operator P02) of the three operators P01, P02, and P101 enters the detection zone (e.g., the detection zone DZ02) set for the operator by the safety control device, the safety operation is executed in the control method.

Here, for example, characteristics such as knowledge of an operation of a machine, details of an assigned operation, a skill level of an operation, and a body shape vary according to each operator. According to these characteristics, it can be assumed that the "distance from the machine (i.e., the detection zone)" necessary for performing the operation while sufficiently securing safety also varies. Specifically, an operator who is familiar with the operation of the machine and has a high skill level of the operation can perform the operation while sufficiently securing safety even if a distance from the machine is somewhat short. On the other hand, an operator who does not have sufficient knowledge of the operation of the machine and is unfamiliar with the operation is considered to need to be farther from the machine in order to perform the operation while sufficiently securing safety.

Conventionally, the above-described characteristics of each operator who performs an operation are not considered with respect to a detection zone for securing the safety of the operator (i.e., a distance from the machine) in the dangerous region where the operation space of the machine overlaps the operation space of the operator. Specifically, a detection zone corresponding to "the distance from the machine" for securing safety to the utmost is set so that any operator can perform an operation while sufficiently securing safety regardless of the above-described characteristics of each operator who performs an operation conventionally. In other words, in the control method of the conventional safety control device, a safety operation is executed even when "an operator who is familiar with the operation of the machine and has a high skill level of the operation" enters the detection zone for securing the safety of "an operator who does not have sufficient knowledge of the operation of the machine and is unfamiliar with the operation." Thus, there is a problem in that the control method of the conventional safety control device causes the machine to be paused and causes an operation rate of the machine to be decreased frequently.

According to the above-described configuration, in the control method, each of the plurality of operators is identified and the above-described detection zone is set for each operator. In the control method, a position of each of the plurality of operators simultaneously present within the dangerous region is identified and the safety operation is executed when a certain operator enters the detection zone set for the certain operator.

For example, in the control method, different detection zones are set for "an operator who is familiar with the operation of the machine and has a high skill level of the operation" and "an operator who does not have sufficient knowledge of the operation of the machine and is unfamiliar with the operation." Thus, in the control method, a safety operation is not executed when "an operator who is familiar with the operation of the machine and has a high skill level of the operation" enters the detection zone for securing the safety of "an operator who does not have sufficient knowledge of the operation of the machine and is unfamiliar with the operation." That is, because a safety operation is executed (e.g., the machine is paused) in the control method only when it is necessary to secure the safety of the specific operator, the operation rate of the machine can be minimized.

Therefore, it is possible to set an optimum detection zone for minimizing a decrease in an operation rate of a machine while securing safety of each operator with respect to a plurality of operators in the control method. In other words, it is possible to execute an optimum safety operation for each operator and minimize a decrease in an operation rate of the machine even when a plurality of operators having different characteristics such as knowledge of an operation of a machine, details of an assigned operation, a skill level of an operation, and a body shape are simultaneously present within the dangerous region in the control method.

According to an embodiment of the disclosure, it is possible to set an optimum detection zone for minimizing a decrease in an operation rate of a machine while securing safety of each operator who performs an operation in a dangerous region including a region where an operation space of a machine overlaps an operation space of an operator.

Embodiment 1

Hereinafter, embodiment 1 of the disclosure will be described in detail with reference to FIG. 1~FIG. 8. The same or corresponding parts in the drawings are denoted by the same reference signs and description thereof will not be repeated. For ease of description of a safety controller 10 according to an embodiment of the disclosure, an outline of a safety control system 1 including the safety controller 10 will be described with reference to FIG. 2.

(Outline of Safety Control System)

Figure 2:
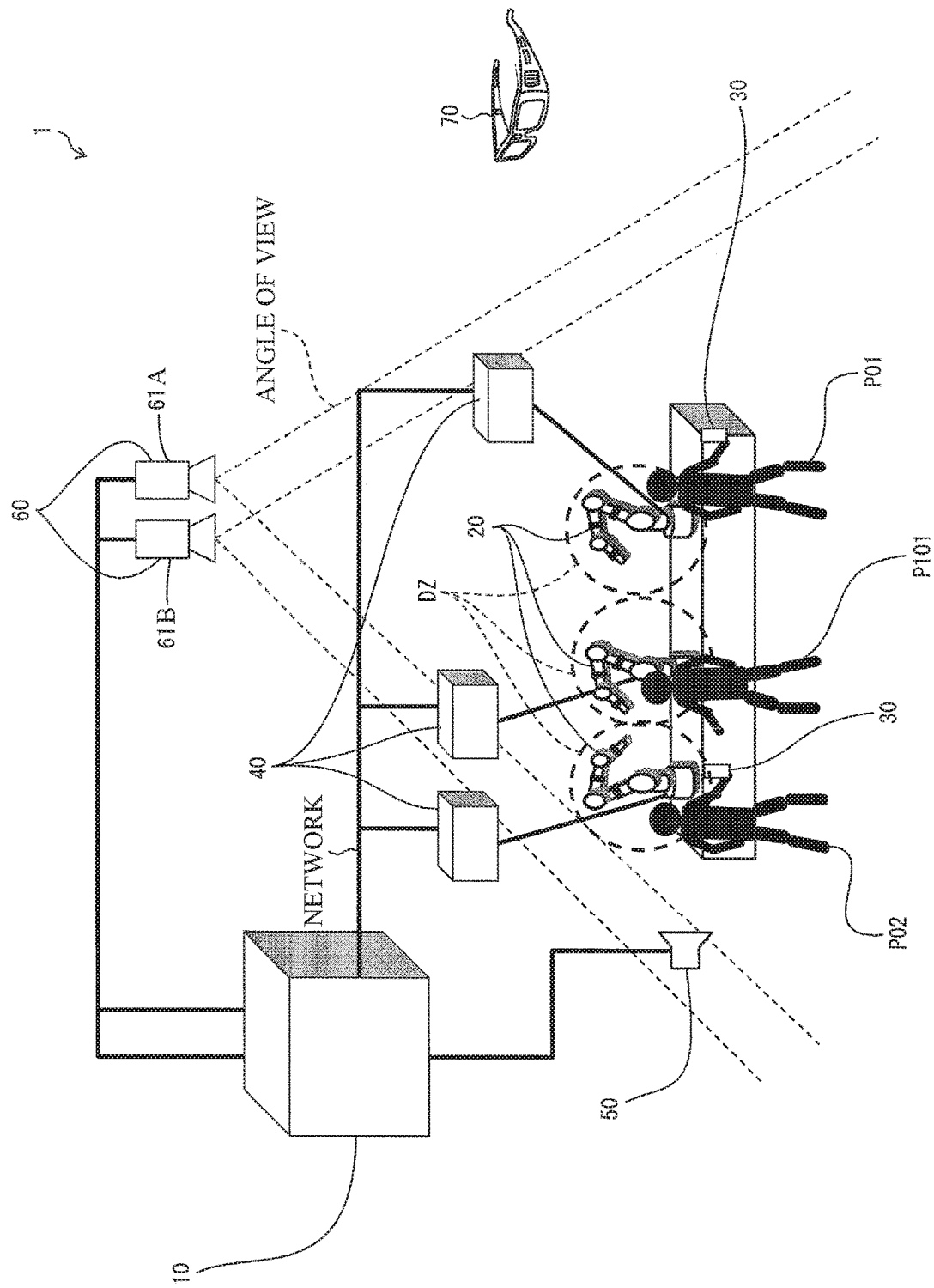
FIG. 2 is a diagram illustrating an overall outline of a safety control system including the safety controller of FIG. 1.

FIG. 2 is a diagram illustrating an overall outline of the safety control system 1 including the safety controller 10. The safety control system 1 is a control system for securing the safety of an operator P in a dangerous region including a region where an operation space of a machine 20 overlaps an operation space of the operator P. As illustrated in FIG. 2, the safety control system 1 includes the safety controller 10, a machine 20, an ID tag 30, a controller 40, a notification device 50, a photographing device 60, and a notification device 70.

Also, although a dangerous region where three machines 20 operate is shown in the example illustrated in FIG. 2, description will be given using an example of a dangerous region where three operators are present around one machine 20 for ease of understanding of the safety control system 1 in the following description. However, the safety controller 10 can naturally secure the safety of the operator P in a dangerous region where a plurality of machines 20 operate as in a dangerous region where one machine 20 operates.

Specifically, an example of a dangerous region where three operators P such as operators P01, P02, and P101 are present around the machine 20 will be described below. The operator P01 is assumed to be an operator of "skill level=expert" carrying the ID tag 30(01) indicating "ID=01." Also, the operator P02 is assumed to be an operator of "skill level=beginner" carrying the ID tag 30(02) indicating "ID=02." Also, the operator P101 is assumed to be a visitor to whom no ID is assigned.

The operators P01, P02, and P101 currently occupy space regions indicated by current positions CP01, CP02, and CP101. In other words, the current positions of the operators P01, P02, and P101 are the current positions CP01, CP02, and CP101, respectively.

In the following description, when it is not necessary to particularly distinguish the operators P01, P02, and P101, they are simply referred to as an "operator P." Likewise, when it is not necessary to particularly distinguish the ID tags 30(01) and 30(02), they are simply referred to as an "ID tag 30." Further, when it is not necessary to particularly distinguish the current positions CP01, CP02, and CP101, they are simply referred to as a "current position CP."

The safety controller 10 is a safety control device configured to execute a safety operation when it is determined that the operator P has entered the detection zone DZ in the dangerous zone including the region where the operation space of the machine 20 overlaps the operation space of the operator P. Specifically, when it is determined that the operator P has entered the detection zone DZ, the safety controller 10 outputs a safety control signal to the controller 40, so that the safety controller 10 causes the controller 40 to execute stopping of the operation of the machine 20, a change in the operation speed, a change in the operation direction, and the like.

Here, in the conventional safety control system, only one detection zone DZ capable of securing safety to the utmost for all operators P is set when a plurality of operators P having different roles and skill levels are simultaneously present around the machine 20. Thus, because the machine 20 should be paused even when an operator P who is qualified to perform an operation in proximity to the machine 20 (e.g., the operator P01 having skill level=expert) approaches the machine 20 to perform an operation, there is a problem in that the operation rate of the machine 20 is decreased.

In the safety control system 1, the safety controller 10 has a function of identifying each of the plurality of operators P and sets a plurality of detection zones DZ associated with the plurality of operators P. The safety controller 10 sets a degree to which each operator P can approach the machine 20 (=a distance, i.e., the detection zone DZ). When the qualified operator P approaches the machine 20 up to a predetermined distance (i.e., up to the detection zone DZ set for the operator P) to perform an operation, the safety controller 10 does not pause machine 20. Therefore, the safety controller 10 sets the optimum detection zone DZ for each operator P who performs the operation around the machine 20 and executes the safety operation, so that it is possible to prevent the operation rate of the machine 20 from being decreased.

The safety controller 10 can set a different detection zone DZ for each operator P and notifies only a certain operator P of entry (="The machine 20 is stopped because of you!") when the certain operator P enters the detection zone DZ set for the certain operator P.

In the safety control system 1, the safety controller 10 can be regarded as an image-based human body detection device for the purpose of stopping the machine 20 when the operator P enters the region where the machine 20 operates. The safety controller 10 identifies each of the plurality of operators P and sets the detection zone DZ for each operator P so that the execution condition of a safety operation changes in accordance with, for example, whether the operator P is an expert or a beginner.

The safety controller 10 sets an optimum detection zone DZ for each operator P and distinguishes operators P approaching the detection zone DZ. Therefore, even when a plurality of operators P having different characteristics such as a skill level, an assigned role, and an ability perform operations simultaneously around the machine 20, each of the plurality of operators P can safely perform an operation without stopping the machine 20 by using the corresponding detection zone DZ.

For example, the machine 20 is an automated machine (a production facility) such as a press machine or a robot arm and operates in accordance with control of the controller 40. For example, the machine 20 performs stopping of the operation, a change in the operation speed, and a change in the operation direction in accordance with control of the controller 40.

The ID tag 30 is a tag attached to the operator P or a tag carried by the operator P, and the ID (identification information) of the operator P is optically written. In the ID tag 30, the ID may be displayed by, for example, a barcode, a QR code (registered trademark) or the like, and text or the like representing the ID may be displayed as it is. It is only necessary to optically write the ID of the operator P who carries the ID tag 30 to the ID tag 30 and it is only necessary for the safety controller 10 to acquire an ID indicated in the ID tag 30 from an image obtained by a photographing device 60 photographing the ID tag 30, i.e., from an image obtained by photographing a dangerous region.

For example, the ID tag 30 may be arranged on an upper surface of a hat, a helmet, or the like worn by the operator P, an upper surface of a shoulder portion/arm portion of a uniform, or the like. For example, when the photographing device 60 is installed on a ceiling of a factory or the like and photographs the dangerous region from above, the ID tag 30 is arranged at a position where photographing from above is facilitated, so that the safety controller 10 can acquire the ID indicated in the ID tag 30 with high accuracy from an image obtained by photographing the dangerous region.

The controller 40 is a control device configured to control the operation of the machine 20. When a safety control signal is received from the safety controller 10, the controller 40 executes a safety control process such as stopping of the power supply for the machine 20, stopping of the machine 20, minimizing of an operation speed, or changing of the operation direction. The controller 40 controls the operation of the machine 20 and the safety controller 10 outputs a command (a safety control signal) to the controller 40.

The photographing device 60 includes a plurality of cameras for photographing a dangerous region. In the present embodiment, the photographing device 60 includes two cameras 61A and 61B. The cameras 61A and 61B transmit video data acquired by photographing the dangerous region (data of captured images of the dangerous region) to the safety controller 10. For example, the photographing device 60 is installed on a ceiling of a factory or the like, acquires a captured image obtained by photographing the dangerous region from above, and transmits data of the captured image to the safety controller 10. In the following description, when it is not necessary to particularly distinguish the two cameras 61A and 61B, they are simply referred to as a "camera."

In accordance with the control of the safety controller 10, the notification device 50 notifies the operator P of a "positional relationship between the operator and the detection zone DZ set by the safety controller 10 for the operator P (e.g., whether the distance is short or whether the operator P has entered the detection zone DZ)."

For example, the notification device 50 is a light-emitting device using a light emitting diode (LED) configured to change a blink speed, the color of light to be output, or the like in accordance with the control of the safety controller 10, and is a light-emitting device carried by the operator P. The notification device 50 may blink in yellow when the operator P approaches the detection zone DZ set for each operator P at a predetermined distance or more and blink in yellow by setting a blink interval to a shorter interval when the operator P is closer to the detection zone DZ. Then, when the operator P enters the detection zone DZ set for each operator P, the notification device 50 may blink in red. For example, the notification device 50 notifies the operator P01 of entry when the operator P01 enters the detection zone DZ01 set for the operator P01 and notifies the operator P02 of entry when the operator P02 enters the detection zone DZ02 set for the operator P02.

Also, for example, the notification device 50 may be a sound output device configured to change a sound volume, a sound level, a sound output interval, and details or the like of a sound to be output in accordance with the control of the safety controller 10. Further, for example, the notification device 50 may be a vibration generation device configured to change a magnitude of vibration, an interval between vibration and pause, and the like in accordance with the control of the safety controller 10.

It is only necessary for the notification device 50 to notify the operator P of a "positional relationship between the operator and the detection zone DZ set by the safety controller 10 for the operator P (e.g., whether the distance is short or whether the operator P has entered the detection zone DZ)" by using various conventional notification technologies.

The notification device 70 notifies the operator P of the detection zone DZ set by the safety controller 10 for the operator P in accordance with the control of the safety controller 10. For example, the notification device 70 notifies the operator P01 of the detection zone DZ01 set by the safety controller 10 for the operator P01, and notifies the operator P02 of the detection zone DZ02 set by the safety controller 10 for the operator P02.

For example, the notification device 70 is a wearable display terminal worn by each of the operators P, and may display the detection zone DZ set by the safety controller 10 for the operator P on a display screen in accordance with the control of the safety controller 10. A head mounted display, a smart glass, and the like are examples of the wearable display terminal.

In accordance with the control of the safety controller 10, the notification device 70 implemented by the wearable display terminal may display a three-dimensional detection zone DZ set for the operator P overlapping a field of view of each of the operators P equipped with the notification device 70 as augmented reality (AR). Specifically, the notification device 70 implemented by the wearable display terminal may detect a position of an eye of the operator P and a direction of a line of sight, and project the three-dimensional detection zone DZ set for the operator P overlapping the field of view of the operator P through a transmission type small-sized display. The notification device 70 implemented by the wearable display terminal may display information about a distance from the machine 20 when the machine 20 is not included in the field of view of the operator P.

The notification device 50 and the notification device 70 may be the same device, and for example, the notification device 70 implemented by the wearable display terminal may also operate as the notification device 50. Specifically, the wearable display terminal worn by each of the operators P displays the detection zone DZ set for each operator P on the display screen, and blinks the displayed image in yellow when the operator P approaches the detection zone DZ at a predetermined distance or more. The wearable display terminal may cause the displayed image to blink in red when the operator P enters the detection zone DZ set for each operator P.

Further, the ID tag 30 and the notification device 70 may be configured integrally. For example, the ID tag 30 may be attached to the notification device 70 implemented by the wearable display terminal. The safety controller 10 may acquire the ID of the operator P from the ID tag 30 provided in the wearable display terminal (the notification device 70) worn by the operator P and cause the wearable display terminal to display the detection zone DZ set for each ID.

It is only necessary for the notification device 70 to notify the operator P of the detection zone DZ set by the safety controller 10 for the operator P. In the notification method, various conventional notification technologies can be used.

(Regarding Safety Control Device)

The outlines of the safety control system 1 and the devices (the safety controller 10, the machine 20, the ID tag 30, the controller 40, the notification device 50, the photographing device 60, and the notification device 70) included in the safety control system 1 have been described above with reference to FIG. 2. Next, details of the configuration, the process, and the like of the safety controller 10 included in the safety control system 1 will be described with reference to FIG. 1 and the like. Before description of the details of the safety controller 10 with reference to FIG. 1, the outline of the safety controller 10 will be summarized below for ease of understanding of the safety controller 10.

(Outline of Safety Control Device) The safety controller 10 (the safety control device) is a safety control device configured to execute a safety operation when it is determined that the operator P has entered the detection zone DZ in the dangerous region including the region where the operation space of the machine 20 overlaps the operation space of the operator P. The safety controller 10 includes an ID tag positioning unit 112 (an acquisition unit) configured to acquire an ID (identification information) of each of a plurality of operators P01, P02, and P101 simultaneously present within the dangerous region; a setting unit 120 configured to set the detection zone DZ (i.e., a detection zone DZ01, DZ02, or DZ101) for each operator P whose ID is acquired by the ID tag positioning unit 112; and an operator identification unit 113 (a position identification unit) configured to identify a current position CP (a position) (i.e., a current position CP01, CP02, or CP101) of each of the plurality of operators P01, P02, and P101 whose IDs are acquired by the ID tag positioning unit 112 in the dangerous region. The safety controller 10 executes the safety operation when at least one (e.g., the operator P02) of the plurality of operators P01, P02, and P101 whose IDs are acquired by the ID tag positioning unit 112 enters the detection zone DZ (e.g., the detection zone DZ02) set for at least one operator (e.g., the operator P02) by the setting unit 120.

According to the above-described configuration, the safety controller 10 sets the detection zone DZ for each operator P and executes the safety operation when at least one of the plurality of operators P enters the detection zone DZ set for the at least one operator P. For example, the safety controller 10 sets the detection zones DZ01, DZ02, and DZ101 for the three operators P01, P02, and P101. Then, the safety controller 10 executes the safety operation when at least one (e.g., the operator P02) of the three operators P01, P02, and P101 enters the detection zone (e.g., detection zone DZ02) set for the operator.

Here, for example, characteristics such as knowledge of an operation of the machine 20, details of an assigned operation, a skill level of an operation, a body shape, and the like vary according to each operator. According to these characteristics, it can be assumed that the "distance from the machine 20 (i.e., the detection zone DZ)" necessary for performing the operation while sufficiently securing safety also varies. Specifically, an operator (e.g., the operator P01) who is familiar with the operation of the machine 20 and has a high skill level can perform the operation while sufficiently securing safety even if a distance from the machine 20 is somewhat short. On the other hand, an operator (e.g., the operator P02) who does not have sufficient knowledge of the operation of the machine 20 and is unfamiliar with the operation is considered to need to be farther from the machine 20 so that the operation is performed while sufficiently securing safety.

Conventionally, the above-described characteristics of each operator who performs an operation are not considered with respect to a detection zone DZ for securing the safety of the operator (i.e., a distance from the machine 20) in the dangerous region where the operation space of the machine 20 overlaps the operation space of the operator P. Specifically, a detection zone DZ corresponding to the "distance from the machine 20" for securing safety to the utmost is set so that any operator P can perform an operation while sufficiently securing safety regardless of the above-described characteristics of each operator P who performs an operation conventionally. In other words, the conventional safety control device executes a safety operation even when "an operator P (e.g., the operator P01) who is familiar with the operation of the machine 20 and has a high skill level of the operation" enters the detection zone DZ for securing the safety of "an operator P (e.g., the operator P02) who does not have sufficient knowledge of the operation of the machine 20 and is unfamiliar with the operation." Thus, there is a problem in that the conventional safety control device causes the machine 20 to be paused and causes an operation rate of the machine 20 to be decreased frequently.

According to the above-described configuration, the safety controller 10 identifies each of the plurality of operators P and sets the above-described detection zone DZ for each operator P. The safety controller 10 identifies a position (a current position CP) of each of the plurality of operators P simultaneously present within the dangerous region and executes the safety operation when a certain operator P enters the detection zone DZ set for the certain operator P.

For example, the safety controller 10 sets different detection zones DZ (e.g., the detection zones DZ01 and DZ02) for "an operator (e.g., the operator P01) who is familiar with the operation of the machine and has a high skill level of the operation" and "any operator (e.g., the operator P02) who does not have sufficient knowledge of the operation of the machine and is unfamiliar with the operation." Thus, the safety controller 10 does not execute a safety operation when "an operator (e.g., the operator P01) who is familiar with the operation of the machine and has a high skill level of the operation" enters the detection zone DZ02 for securing the safety of "an operator (e.g., the operator P02) who does not have sufficient knowledge of the operation of the machine and is unfamiliar with the operation." That is, because the safety controller 10 executes a safety operation (e.g., pauses the machine 20) only when it is necessary to secure the safety of the specific operator P, a decrease in the operation rate of the machine 20 can be minimized.

Therefore, the safety controller 10 can set an optimum detection zone DZ for minimizing a decrease in an operation rate of a machine 20 while securing safety of an operator P for each operator P with respect to a plurality of operators P. In other words, the safety controller 10 can execute an optimum safety operation for each operator P and minimize a decrease in an operation rate of the machine 20 even when a plurality of operators P having different characteristics such as knowledge of an operation of a machine 20, details of an assigned operation, a skill level of an operation, and a body shape are simultaneously present within the dangerous region.

In the safety controller 10, the ID tag positioning unit 112 may acquire the identification information of the operator P within the dangerous region by using at least one of an image obtained by photographing the dangerous region and a signal from a wireless tag storing the ID of the operator P that is a wireless tag carried by the operator P.

According to the above-described configuration, the safety controller 10 acquires the ID of the operator P within the dangerous region by using at least one of an image obtained by photographing the dangerous region and a signal from a wireless tag storing the identification information of the operator P that is a wireless tag carried by the operator P.

Here, for the purpose of managing a human entering the dangerous region or the like, it is conventionally general to carry a wireless tag storing identification information of the human or the like. Therefore, because the safety controller 10 can easily acquire the identification information of the operator P from such a wireless tag, the additional cost for implementing the safety management using the safety controller 10 can be minimized.

Also, for the purpose of monitoring the dangerous region or the like, it is conventionally general to photograph the dangerous region in which the operator P performs an operation. Therefore, because the safety controller 10 can easily acquire identification information of the operator P from an image obtained by photographing the dangerous region, the additional cost for implementing the safety management using the safety controller 10 can be minimized.

Therefore, the safety controller 10 can easily acquire the identification information of the operator P within the dangerous region with the low implementation cost by using at least one of the image and the signal from the wireless tag.

Also, in the following description, description will be focused on an example in which the ID tag positioning unit 112 acquires the identification information of the operator P within the dangerous region by using an image obtained by photographing the dangerous region. In other words, in the following description, an example in which the ID tag positioning unit 112 acquires the identification information of the operator P within the dangerous region by performing a process of analyzing the image obtained by photographing the dangerous region or the like will be mainly described.

However, a method in which the ID tag positioning unit 112 acquires the identification information of the operator P within the dangerous region is not limited to the process of analyzing the image obtained by photographing the dangerous region or the like. Details will be described below as "other modified examples," but the ID tag positioning unit 112 may acquire identification information of the operator P within the dangerous region by using, for example, a signal from a wireless tag storing the ID of the operator P that is a wireless tag carried by the operator P. In other words, the ID tag positioning unit 112 performs radio signal processing on the signal from the wireless tag storing the ID of the operator P as the wireless tag carried by the operator P, so that the identification information of the operator P within the dangerous region or the like may be acquired. Therefore, the ID tag positioning unit 112 is not necessarily a functional block within the image processing unit 110 configured to execute the image processing. The ID tag positioning unit 112 may acquire the identification information of the operator P within the dangerous region by using at least one of an image obtained by photographing the dangerous region and a signal from a wireless tag storing the identification information of the operator P that is a wireless tag carried by the operator P.

The safety controller 10 may further include a notification control unit 150 (a notification unit) configured to notify the operator P having entered the detection zone DZ that the operator P has entered the detection zone DZ set for the operator P when the operator P whose ID is acquired by the ID tag positioning unit 112 has entered the detection zone DZ set for the operator P by the setting unit 120.

According to the above-described configuration, the safety controller 10 notifies the operator P having entered the detection zone DZ that the operator P has entered the detection zone DZ set for the operator P when the operator P whose ID is acquired by the ID tag positioning unit 112 has entered the detection zone DZ set for the operator P by the setting unit 120.

As described above, the safety controller 10 sets the detection zone DZ for each operator P and executes the optimum safety operation for each operator P. For example, if the safety operation is executed in a state in which a plurality of operators P are simultaneously present within the dangerous zone DZ, it may be difficult to ascertain an operator P who has caused the execution of the safety operation because the detection zone DZ is set for each operator P.

In order to avoid such a situation, when a certain operator P has entered the detection zone DZ set for the certain operator P, the safety controller 10 notifies the certain operator P that the certain operator P has entered the detection zone DZ set for the certain operator P.

Therefore, for example, the safety controller 10 can provide a notification indicating an operator P who has caused the execution of the safety operation to the operator P who is the cause thereof even when the safety operation is executed in a state in which a plurality of operators P are simultaneously present in the dangerous region.

The notification control unit 150 of the safety controller 10 can cause a certain operator P to recognize a cause of execution of the safety operation by notifying the certain operator P that the certain operator P has entered the detection zone DZ set for the certain operator P.

Also, the notification control unit 150 of the safety controller 10 may notify the certain operator P of a "positional relationship between the detection zone DZ set for the certain operator P and a current position CP of the certain operator P (e.g., whether the distance is short)." The notification control unit 150 prompts the certain operator P to avoid entering the detection zone DZ set for the certain operator P by notifying the certain operator P that he/she is approaching the detection zone DZ set for the certain operator P. Therefore, the notification control unit 150 can prevent the certain operator P from causing an unintentional stoppage or the like of the machine 20.

The safety controller 10 may further include a notification control unit 160 (a notification unit) configured to notify the operator P whose ID is acquired by the ID tag positioning unit 112 of the detection zone DZ set for the operator P by the setting unit 120.

According to the above-described configuration, the safety controller 10 notifies the operator P whose ID is acquired by the ID tag positioning unit 112 of the detection zone DZ set for the operator P by the setting unit 120.

As described above, because the safety controller 10 sets the detection zone DZ for each operator P, it may be difficult for the operator P to ascertain the detection zone DZ specific to him/her.

In order to avoid such a situation, the safety controller 10 notifies a certain operator P of a detection zone DZ set for the certain operator P.

Therefore, the safety controller 10 can notify each operator of the detection zone DZ set for each operator P.

In the safety controller 10, the notification control unit 160 may cause the wearable display terminal worn by the operator P to display the detection zone DZ set for the operator P by the setting unit 120 and the ID tag positioning unit 112 may acquire an ID of the operator P from a tag to which the ID of the operator P is written (e.g., an ID tag 30 to which the ID is written) as a tag provided in the wearable display terminal.

According to the above-described configuration, the safety controller 10 causes the wearable display terminal worn by the operator P to display the detection zone DZ set for the operator P, and acquires identification information of the operator P from the tag provided in the wearable display terminal.

Therefore, the safety controller 10 can notify each operator P of the detection zone DZ set for each operator P by causing the wearable display terminal worn by the operator P to display the detection zone DZ set for each operator P.

Also, the safety controller 10 can acquire the identification information of the operator P from the tag of the wearable display terminal worn by the operator P.

That is, in the safety control system 1, the safety controller 10 may acquire the ID of the operator P equipped with the wearable display terminal from the wearable display terminal having the ID tag 30.

Also, in the safety control system 1, the notification device 50 and the notification device 70 may be integrally configured as a wearable display terminal, and the safety controller 10 may cause the wearable display terminal to display the detection zone DZ set for each operator P or the like. For example, the safety controller 10 may display the detection zone DZ set for each operator P on a display screen in the wearable display terminal, and cause the display screen to blink in yellow if the operator P approaches the detection zone DZ at a predetermined distance or more. When the operator P enters the detection zone DZ set for each operator P, the safety controller 10 may instruct the wearable display terminal worn by the operator P to blink the display screen in red. The safety controller 10 can identify each of the operators P and provide notification of information for enabling each of the operators P to efficiently and safely perform an operation.

In the safety controller 10, the setting unit 120 may set the three-dimensional detection zone DZ by using the captured image of the dangerous region photographed by at least two cameras 61A and 61B (i.e., the photographing device 60).

According to the above-described configuration, the safety controller 10 sets the three-dimensional detection zone DZ by using the captured image of the dangerous region photographed by at least two cameras 61A and 61B.

Therefore, the safety controller 10 can set the three-dimensional detection zone DZ in consideration of a body shape (e.g., a height) of the operator P for each operator P or the like and perform an optimum safety operation for each operator P.

(Details of Safety Control Device)

Next, a configuration of the safety controller 10 whose outline has been described above will be described in detail with reference to FIG. 1.

FIG. 1 is a block diagram illustrating a main configuration of the safety controller 10. The safety controller 10 illustrated in FIG. 1 is configured to include a control unit 100 and a storage unit 200. In order to guarantee the simplicity of description, configurations which are not directly related to the present embodiment (e.g., a configuration for receiving a user operation, a configuration for communicating with an external device, and the like) are omitted from the description and the block diagram. However, in accordance with actual circumstances of implementation, the safety controller 10 may include the configurations omitted therefrom.

(Control Unit)

The control unit 100 generally controls functions of the safety controller 10. The illustrated control unit 100 includes an image processing unit 110, a setting unit 120, a determination unit 130, an output control unit 140, a notification control unit 150, and a notification control unit 160 as functional blocks.

The image processing unit 110 includes an approaching object positioning unit 111, an ID tag positioning unit 112, and an operator identification unit 113. The image processing unit 110 analyzes video data acquired by photographing device 60 photographing the dangerous region, and identifies a current position CP and an ID of the operator P present within the dangerous region. (A) The image processing unit 110 measures the current position CP of the operator P present within an angle of view (i.e., within the dangerous region) on the basis of video data acquired by the photographing device 60 photographing the dangerous region (mainly, a function implemented by the approaching object positioning unit 111). (B) On the basis of the video data, the image processing unit 110 performs positioning of the ID tag 30 present within the angle of view and extracts the ID indicated in the ID tag 30 (mainly, a function implemented by the ID tag positioning unit 112). (C) The image processing unit 110 uses position information of the ID tag 30 to associate the ID with the measured current position CP of the operator P (mainly, a function implemented by the operator identification unit 113).

That is, the image processing unit 110 calculates a spatial position of a feature point or the like by using an image captured by each of the two cameras 61A and 61B (a captured stereo image). Specifically, the image processing unit 110 calculates a "spatial position (a current position CP) of a foreign object (i.e., the operator P)" and a "spatial position of the ID tag 30." The image processing unit 110 notifies the setting unit 120 and the determination unit 130 of the calculated "spatial position of the foreign object (the current position CP)," the calculated "spatial position of the ID tag 30," and the like.

Also, the image processing unit 110 acquires the ID indicated in the ID tag 30 by using the images captured by each of the two cameras 61A and 61B, and notifies the setting unit 120 and the determination unit 130 of the acquired ID.

Also, because various conventional technologies can be used for a method of "extracting feature points from the captured stereo image by using data of the captured stereo image and acquiring three-dimensional information of the extracted feature points" to be executed by the image processing unit 110, details thereof will be briefly described.

The approaching object positioning unit 111 identifies the current position CP of the foreign object (specifically, the operator P) present within the dangerous region (in other words, a space region currently occupied by the foreign object) from the captured image of the dangerous region. The approaching object positioning unit 111 notifies the operator identification unit 113 of the identified "current position CP of the foreign object." For example, the approaching object positioning unit 111 identifies the current positions CP01, CP02, and CP101, and notifies the operator identification unit 113 of the identified current positions CP01, CP02, and CP101.

The ID tag positioning unit 112 (an acquisition unit) identifies the ID indicated in the ID tag 30 present within the dangerous region and the position of the ID tag 30 from the captured image of the dangerous region. The ID tag positioning unit 112 notifies the operator identification unit 113 and the setting unit 120 of the "ID indicated in the ID tag 30 and the position of the ID tag 30" which are identified. For example, the ID tag positioning unit 112 notifies the operator identification unit 113 and the setting unit 120 of the position of the ID tag 30(01) and "ID=01" indicated in the ID tag 30(01). Also, the ID tag positioning unit 112 notifies the operator identification unit 113 of the position of the ID tag 30(02) and "ID=02" indicated in the ID tag 30(02).

Also, the ID tag positioning unit 112 notifies the setting unit 120 of the ID indicated in the ID tag 30 present within the dangerous region, specifically, "ID=01" and "ID=02," from the captured image of the dangerous region.

The operator identification unit 113 (a position identification unit) identifies an ID (more precisely, whether or not an ID is assigned and an assigned ID when the ID is assigned) and a current position CP for the operator P. First, the operator identification unit 113 acquires the "current position CP of the foreign object (a space region currently occupied by the foreign object)" identified by the approaching object positioning unit 111 from the approaching object positioning unit 111. Also, the operator identification unit 113 acquires the "ID indicated in the ID tag 30 and the position of the ID tag 30" identified by the ID tag positioning unit 112 from the ID tag positioning unit 112. Then, the operator identification unit 113 combines the acquired "current position CP of the foreign object (i.e., the operator P)" and the "ID indicated in the ID tag 30 and the position of the ID tag 30" and identifies the ID and the current position CP for the operator P.

(A) If there is an ID tag 30 at a position overlapping the current position CP (or at a close position), the operator identification unit 113 identifies the ID indicated in the ID tag 30 as identification information of a foreign object present at the current position CP, i.e., a foreign object occupying the current position CP. For example, if it is determined that the ID tag 30(01) is present at a position overlapping the current position CP01, the operator identification unit 113 identifies "ID=01" indicated in the ID tag 30(01) as the identification information of the foreign object (the operator P01) occupying the current position CP01. In other words, the operator identification unit 113 associates the current position CP01 with "ID=01." Likewise, for example, if it is determined that the ID tag 30(02) is present at a position overlapping the current position CP02, the operator identification unit 113 identifies "ID=02" indicated in the ID tag 30 (02) as the identification information of the foreign object (the operator P02) occupying the position CP02. In other words, the operator identification unit 113 associates the current position CP02 with "ID=02."

(B) If there is no ID tag 30 at a position overlapping the current position CP (or a close position), the operator identification unit 113 identifies that the foreign object present at the current position CP is a foreign object which does not carry the ID tag 30 (i.e., "no ID"). For example, if it is determined that the ID tag 30 is not present at a position overlapping the current position CP101 of the foreign object (or at a close position), the operator identification unit 113 identifies that the foreign object present at the current position CP101 is a foreign object of "no ID."

Also, when it is determined that no ID tag 30 is present at a position overlapping the current position CP101 of the foreign object (or at a close position), the operator identification unit 113 may associate an ID indicating that "no ID is assigned" with the current position CP101. For example, if a normal ID is a number ranging from "0~99," the operator identification unit 113 associates an ID of number 100s, specifically, "ID=101," as an ID indicating that "no ID is assigned" with the current position CP101. In the following description, "ID=101" may be associated with the current position CP101, i.e., the operator P101 occupying the current position CP101. In other words, in the following description, "ID=101" may be used as identification information indicating "no ID."

In summary, (A) if the ID tag 30 is present at a position overlapping the current position CP, the operator identification unit 113 identifies an ID indicated in the ID tag 30 as identification information of the foreign object present at the current position CP (i.e., the foreign object occupying the current position CP). In other words, the operator identification unit 113 associates the "current position CP" with the "ID of the ID tag 30 present at a position overlapping the current position CP." The operator identification unit 113 notifies the determination unit 130 of the "current position CP" associated with the "ID of the ID tag 30 present at the position overlapping the current position CP."

For example, the operator identification unit 113 associates the "current position CP01" with the "ID indicated in the ID tag 30(01) present at a position overlapping the current position CP01" and notifies the determination unit 130 of the current position CP01 associated with "ID=01." Also, the operator identification unit 113 associates the "current position CP02" with the "ID=2 indicated in the ID tag 30(02) present at a position overlapping the current position CP02" and notifies the determination unit 130 of the current position CP02 associated with "ID=02."

(B) If the ID tag 30 is not present at a position overlapping the current position CP, the operator identification unit 113 determines that "no ID is assigned to the foreign object present at the current position CP (i.e., the foreign object occupying the current position CP)." Then, the operator identification unit 113 associates the current position CP with "no ID (or an "ID indicating that no "ID is assigned")." The operator identification unit 113 notifies the determination unit 130 of the current position CP associated with "no ID (or an ID indicating that "no ID is assigned")."

For example, if it is determined that "there is no ID tag 30 present at a position overlapping the current position CP101," the operator identification unit 113 associates the "current position CP101" with "no ID (or "ID=101")." Then, the operator identification unit 113 notifies the determination unit 130 of the current position CP101 associated with "no ID (or "ID=101")."

The setting unit 120 sets the detection zone DZ for each operator P (in other words, for each ID) with reference to set reference information 210 and detailed operator information 220 stored in the storage unit 200.

(Detection Zone for Operator to which ID is Assigned)

The setting unit 120 sets the detection zone DZ for each of "ID=01" and "ID=02" indicated in a notification from the ID tag positioning unit 112 with reference to the set reference information 210 and the detailed operator information 220 stored in the storage unit 200. In other words, the setting unit 120 sets the detection zone DZ01 for the operator P01 having "ID=01" and sets the detection zone DZ02 for the operator P02 having "ID=02."

(Detection Zone for Operator to which no ID is Assigned)

The setting unit 120 sets the detection zone DZ101 for the operator P101 of "no ID (or "ID=101") with reference to the set reference information 210 and the detailed operator information 220 stored in the storage unit 200.

Details of a method in which the setting unit 120 sets detection zones DZ01, DZ02, and DZ101 will be described below with reference to FIG. 6. The setting unit 120 stores the set detection zones DZ01, DZ02, and DZ101 together with corresponding IDs in the storage unit 200 as set detection zone information 230. For example, the setting unit 120 associates "ID=01" with the detection zone DZ01, associates "ID=02" with the detection zone DZ02, associates "no ID" with the detection zone DZ101, and stores association results as the set detection zone information 230 in the storage unit 200.

Also, the setting unit 120 may acquire the "current position CP and the corresponding ID" from the image processing unit 110 (the operator identification unit 113), and store the acquired "current position CP and corresponding ID" as current operator information 240 in the storage unit 200. For example, the setting unit 120 may associate "ID=01" with the current position CP01, associate "ID=02" with the current position CP02, associate "no ID (or "ID=101")" with the current position CP101, and store association results as the current operator information 240 in the storage unit 200.

The determination unit 130 determines "whether or not there is an operator P having entered the detection zone DZ set for each operator P by the setting unit 120" and notifies the notification control unit 150 and the like of a determination result when it is determined that there is an operator P having entered the detection zone DZ set for each operator P. Specifically, the determination unit 130 collates the "current position CP for each operator P" acquired by the image processing unit 110 with data of the detection zone DZ for each operator P stored in the storage unit 200 (the set detection zone information 230). Then, the determination unit 130 determines whether or not the operator P has entered the detection zone DZ set for each operator P. For example, the determination unit 130 determines whether the operators P01, P02, and P101 have entered the detection zones DZ01, DZ02, and DZ101 set for the operators P01, P02, and P101. When it is determined that at least one of the operators P01, P02, and P101 has entered his/her own set detection zone DZ, the determination unit 130 notifies the output control unit 140, the notification control unit 150, and the like of a determination result.

(Determination of Operator to which ID is Assigned)

When the determination unit 130 is notified of the current position CP01 associated with "ID=01" from the image processing unit 110, the determination unit 130 executes the following process with reference to the set detection zone information 230 stored in the storage unit 200. That is, (I) the determination unit 130 acquires the detection zone DZ01 corresponding to "ID=01" with reference to the set detection zone information 230. (II) The determination unit 130 determines a positional relationship between the current position CP01 indicated in the notification from the image processing unit 110 and the acquired detection zone DZ01. (III) The determination unit 130 determines that the state is a "cautionary state" if a distance between the current position CP01 and the detection zone DZ01 is shorter than a predetermined distance, and determines that the state is an "entry state" if the current position CP01 overlaps the detection zone DZ01.

Likewise, when the determination unit 130 is notified of the current position CP02 associated with "ID=02" from the image processing unit 110, (I) the determination unit 130 acquires the detection zone DZ02 corresponding to "ID=02" with reference to the set detection zone information 230. (II) The determination unit 130 determines a positional relationship between the current position CP02 and the detection zone DZ02. (III) The determination unit 130 determines that the state is a "cautionary state" when a distance between the current position CP02 and the detection zone DZ02 is shorter than a predetermined distance and determines that the state is an "entry state" if the current position CP02 overlaps the detection zone DZ02.

(Determination of Operator to which no ID is Assigned)

In the following two cases, the determination unit 130 determines whether or not the operator P without an ID has entered the "detection zone DZ set for the operator P without an ID." That is, (A) if the ID acquired by the image processing unit 110 does not match any of the IDs registered in the detailed operator information 220, the determination unit 130 determines the presence or absence of entry of the operator P without an ID with respect to the "detection zone DZ for the operator P without an ID." As described above, the setting unit 120 sets the optimum detection zone DZ for the operator P for each operator P with reference to the set reference information 210 and the detailed operator information 220. In other words, with respect to any operator P to which an ID is assigned, i.e., who carries the ID tag 30, the setting unit 120 cannot set the optimum detection zone DZ for the operator P whose characteristic, i.e., ID, is not registered in the detailed operator information 220. Thus, the determination unit 130 treats an operator P to which an ID unregistered in the detailed operator information 220 is assigned as an "operator P without an ID" and determines whether the operator P has entered the "detection zone DZ set for the operator P without an ID."

Also, (B) if the ID associated with the operator P whose position is measured by the image processing unit 110 is empty, i.e., if there is a current position CP associated with "no ID (or "ID=101"), the determination unit 130 determines whether or not an operator P without an ID has entered.

For example, when the determination unit 130 is notified of the current position CP101 associated with "no ID" from the image processing unit 110, the determination unit 130 executes the following process with reference to the set detection zone information 230 stored in the storage unit 200. That is, (I) the determination unit 130 acquires the detection zone DZ101 corresponding to "no ID" with reference to the set detection zone information 230. (II) The determination unit 130 determines a positional relationship between the current position CP101 indicated in the notification from the image processing unit 110 and the acquired detection zone DZ101. (III) The determination unit 130 determines that the state is a "cautionary state" if a distance between the current position CP101 and the detection zone DZ101 is shorter than a predetermined distance, and determines that the state is an "entry state" if the current position CP101 overlaps the detection zone DZ101.

The determination unit 130 causes the output control unit 140 to output a safety control signal when it is determined that the state is an "entry state" with respect to at least one of the operators P01, P02, and P101, i.e., at least one of the current positions CP01, CP02, and CP101. Also, the determination unit 130 notifies the notification control unit 150 of the ID corresponding to the current position CP at which the state is determined to be the "entry state" and causes the notification control unit 150 to notify the operator P corresponding to the ID of entry. For example, when it is determined that the state is the "entry state" at the current position CP101, the determination unit 130 notifies the notification control unit 150 of "no ID" corresponding to the current position CP101 and causes the notification control unit 150 to notify the operator P101 corresponding to "no ID" of "entry."

Also, the determination unit 130 notifies the notification control unit 150 of the ID corresponding to the current position CP at which it is determined that the state is a "cautionary state" and causes the notification control unit 150 to notify the operator P corresponding to the ID of the "cautionary state." For example, when it is determined that the state is a "cautionary state" at the current position CP02 is, the determination unit 130 notifies the notification control unit 150 of "ID=02" corresponding to the current position CP02 and causes the notification control unit 150 to notify the "operator P02 corresponding to "ID=02" of the "cautionary state."

The output control unit 140 outputs a safety control signal which is a signal for stopping the operation of the machine 20 when the determination unit 130 determines that the "operator P has entered the detection zone DZ." The output control unit 140 is, for example, an output signal switch device (OSSD) and is brought into an OFF state in accordance with an operation of a detector during the steady operation of the machine 20 (i.e., the detection of the operator P in the detection zone DZ) (i.e., outputs a safety control signal). Also, the output control unit 140 is brought into an OFF state even when the safety controller 10 detects an internal failure and is brought into a locked-out state.

When a notification of the determination result indicating that the "operator P has entered the detection zone DZ set for each operator P" is provided from the determination unit 130, the notification control unit 150 notifies the operator P of the determination result. Specifically, the notification control unit 150 causes the notification device 50 of the operator P determined to "have entered the detection zone DZ set for the operator P" by the determination unit 130 to output information indicating that the "operator P has entered the detection zone DZ01 set for each operator P." For example, if the determination unit 130 determines that the "operator P01 has entered the detection zone DZ01 for the operator P01," the notification control unit 150 causes the notification device 50(01) carried by operator P01 to output information indicating that "you have entered the detection zone DZ01." Also, when the determination unit 130 determines that the "operator P02 has entered the detection zone DZ02 for the operator P02," the notification control unit 150 causes the notification device 50(02) carried by the operator P02 to output information indicating that "you have entered the detection zone DZ02." Further, when the determining unit 130 determines that the "operator P101 has entered the detection zone DZ101 for the operator P101," the notification control unit 150 causes the notification device 50(101) carried by the operator P101 to output information indicating that "you have entered the detection zone DZ101."

Also, when the "operator P has entered the detection zone DZ set for each operator P," the notification control unit 150 may notify any operator P other than the operator P having entered the detection zone DZ that the "operator P has entered the detection zone DZ set for each operator P." For example, when the "operator P101 has entered the detection zone DZ101 for the operator P101," the notification control unit 150 may notify the operators P01 and P02 that the "operator P101 has entered the detection zone DZ101 for the operator P101.

The notification control unit 160 notifies the operator P of the detection zone DZ set for each operator P by the setting unit 120. For example, the notification control unit 160 causes the notification device 70 worn by each of the operators P to display the detection zone DZ set for each operator P by the setting unit 120. Specifically, the notification control unit 160 causes the notification device 70(01) worn by the operator P01 to display the detection zone DZ01 for the operator P01 and causes the notification device 70(02) worn by the operator P02 to display the detection zone DZ02 for the operator P02. Likewise, the notification control unit 160 causes the notification device 70(101) worn by the operator P101 to display the detection zone DZ101 for the operator P101.

Also, the notification control unit 160 may notify the operator P other than the operator P of the "detection zone DZ set for the operator P." For example, the notification control unit 160 may notify the operators P01 and P02 of the "detection zone DZ101 for the operator P101."

For example, each functional block of the control unit 100 described above is implemented when a central processing unit (CPU) or the like reads a program stored in a storage device (a storage unit 200) implemented by a read only memory (ROM), a non-volatile random access memory (NVRAM), or the like to a random access memory (RAM) (not illustrated) or the like and executes the program.

(Storage Unit)

The storage unit 200 stores various types of data used by the safety controller 10. That is, the storage unit 200 stores (1) a control program to be executed by the safety controller 10, (2) an OS program, (3) an application program for executing various types of functions, and (4) various types of data to be read when the application program is executed. For example, data of the above-described (1) to (4) is stored in a nonvolatile storage device such as a read only memory (ROM), a flash memory, an erasable programmable ROM (EPROM), an electrically EPROM (registered trademark), or a hard disc drive (HDD). Also, the storage unit 200 stores the set reference information 210, the detailed operator information 220, the set detection zone information 230, and the current operator information 240.

FIG. 3(A), FIG. 3(B), FIG. 3(C) and FIG. 3(D) are diagrams illustrating an example of a data structure of the set reference information 210, the detailed operator information 220, the set detection zone information 230, and the current operator information 240 stored in the storage unit 200 of the safety controller 10.

The set reference information 210 is information used as a reference for setting the detection zone DZ for each operator P in the setting unit 120. For example, the set reference information 210 is information defining how to set the detection zone DZ in accordance with the characteristics of the operator P (characteristics such as knowledge of an operation of the machine, details of an assigned operation, a skill level of an operation, and a body shape).

In the example of the set reference information 210 illustrated in FIG. 3(A), the setting unit 120 defines a method of setting the detection zone DZ in accordance with a skill level of the operator P. Specifically, in the set reference information 210 of FIG. 3(A), "detection zone=0.5 m (which is a distance from the machine 20)" is associated with "skill level=expert." Likewise, in the set reference information 210 of FIG. 3(A), "detection zone=1.0 m (which is a distance from the machine 20)" is associated with "skill level=beginner" and "detection zone=1.5 m (which is a distance from the machine 20)" is associated with "skill level=no setting."

If the setting unit 120 sets the detection zone DZ on the basis of the set reference information 210 of FIG. 3(A), the safety controller 10 (particularly, the determination unit 130) executes the following process. That is, even when it is determined that the operator P who is an expert approaches within 1.5 m of the machine 20 or even when it is determined that the machine P approaches within 1.0 m of the machine 20, the safety controller 10 does not output a safety control signal to the controller 40. The safety controller 10 outputs a safety control signal to the controller 40 only when it is determined that the operator P who is an expert approaches within 0.5 m of the machine 20.

When it is determined that the operator P who is a beginner approaches within 1.5 m of the machine 20, the safety controller 10 does not output the safety control signal to the controller 40. When it is determined that the operator P who is a beginner approaches within 1.0 m of the machine 20, the safety controller 10 outputs a safety control signal to the controller 40. If it is determined that the operator P of "skill level=no setting" (including an operator P whose ID is not stored in the detailed operator information 220) such as a visitor outside the company has approached within 1.5 m of the machine 20, the safety controller 10 outputs a safety control signal to the controller 40.

The detailed operator information 220 is information obtained by arranging characteristic of the operator P (characteristics such as knowledge of an operation of the machine, details of an assigned operation, a skill level of an operation, and a body shape) for each operator P (more precisely, for each ID of the operator P). In the example of the detailed operator information 220 illustrated in FIG. 3(B), an "ID (an operator ID) of an operator P," an "operator name (a name) of an operator P," and a "skill level of an operator P" are associated. Specifically, the example of the detailed operator information 220 illustrated in FIG. 3(B) indicates that a name of an operator P01 having "ID=01" is "Taro Tokyo" and "skill level=expert." Also, the detailed operator information 220 indicates that a name of an operator P02 having "ID=02" is "Jiro Tokyo" and "skill level=beginner." Further, the detailed operator information 220 indicates that a name of an operator P03 having "ID=03" is "Saburo Tokyo" and "skill level=beginner."

The set detection zone information 230 is information indicating an operator P currently present in the dangerous region and a detection zone DZ set for the operator P. Specifically, the example of the set detection zone information 230 illustrated in FIG. 3(C) indicates that the detection zone DZ01 is set for the operator P01 having "ID=01." Also, the set detection zone information 230 indicates that the detection zone DZ02 is set for the operator P02 having "ID=02." Further, the set detection zone information 230 indicates that the detection zone DZ101 is set for the operator P101 without an ID (in other words, the operator P101 managed by the safety controller 10 as the operator P of "ID=101").

The current operator information 240 is information indicating the operator P currently present within the dangerous region and the current position CP of the operator P. Specifically, the example of the current operator information 240 illustrated in FIG. 3(D) indicates that a position where the operator P01 having "ID=01" is currently present (in other words, a currently occupied space region) is a current position CP01. Also, the current operator information 240 indicates that a position where the operator P02 having "ID=02" is currently present is a current position CP02. Further, the present operator information 240 indicates that a position where the operator P101 without an ID (in other words, the operator P101 managed by the safety controller 10 as the operator P of "ID=101") is currently present is a current position CP101.

(Overall Outline of Process Executed by Safety Control Device)

Figure 4:
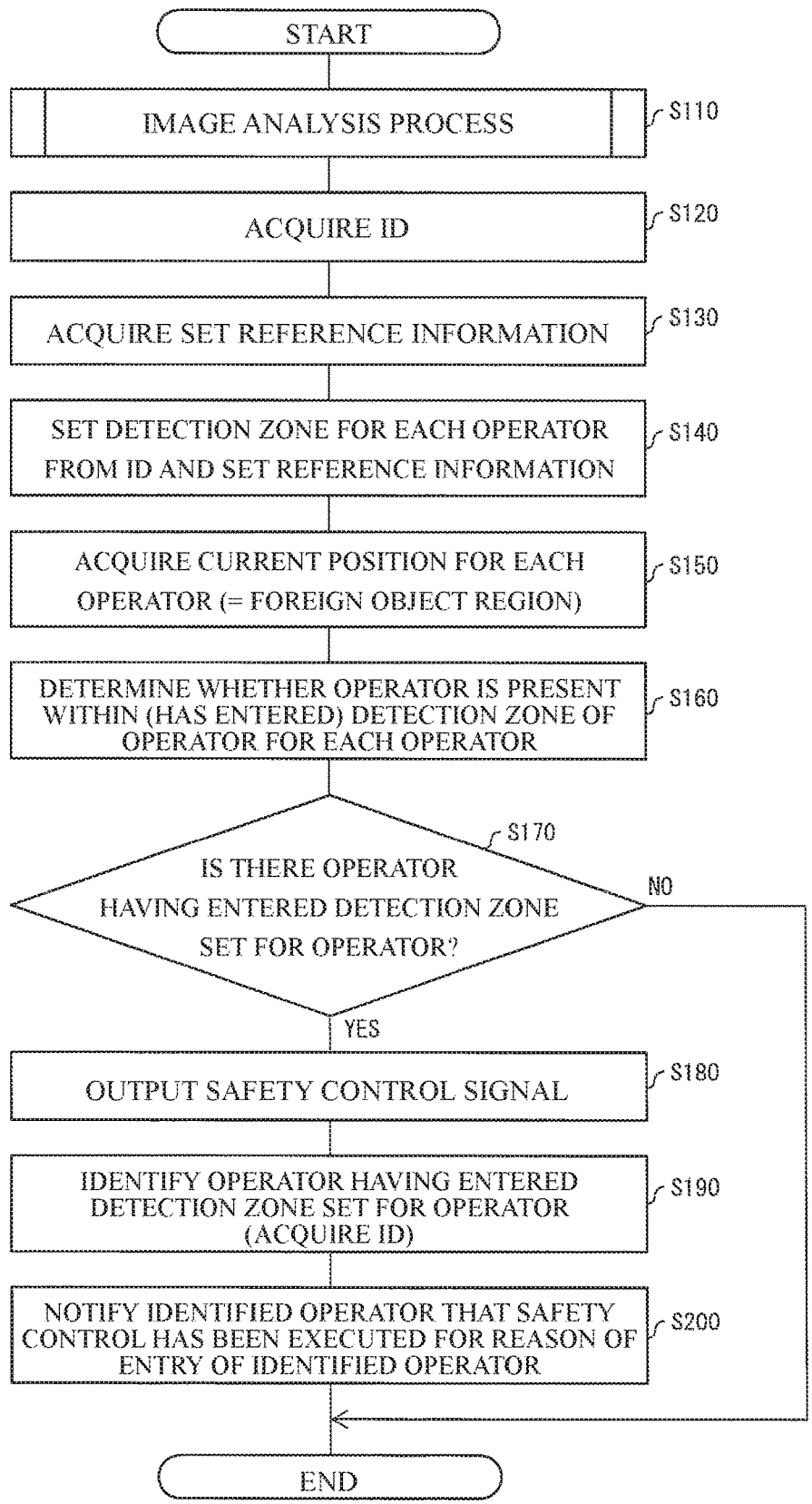
FIG. 4 is a flowchart illustrating an overall outline of a process executed by the safety controller of FIG. 1.
Figure 5:
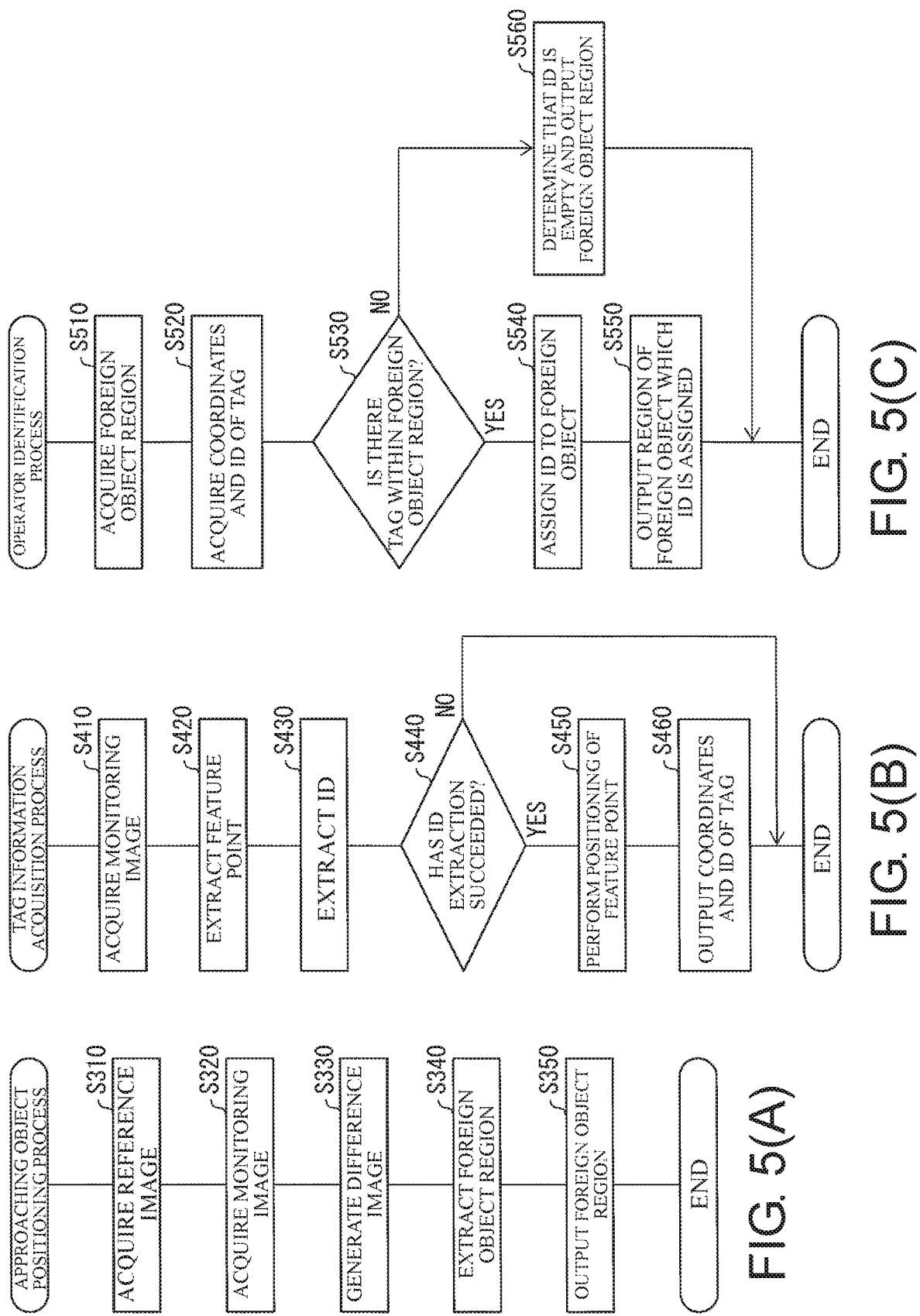
FIG. 5(A), FIG. 5(B) and FIG. 5(C) are flowcharts illustrating an example of an image analysis process executed by the safety controller of FIG. 1.

FIG. 4 is a flowchart illustrating an overall outline of a process executed by the safety controller 10. The process executed by the safety controller 10 can be roughly divided into three processes of an image analysis process, a detection zone setting process, and a determination process. The image analysis process is a process of identifying an ID of an operator P within the dangerous region and a current position CP from a captured image of the dangerous region. The detection zone setting process is a process of setting a detection zone DZ for each operator P within the dangerous region. The determination process is a process of determining whether or not there is an operator P having entered the detection zone DZ set for each operator P and executing outputting of a safety control signal or the like when it is determined that there is an operator P having entered the detection zone DZ set for each operator P. Hereinafter, the entire process executed by the safety controller 10 including the three processes of the image analysis process, the detection zone setting process, and the determination process will be described with reference to FIG. 4.

(Image Analysis Process)

The image processing unit 110 executes image analysis processing including three processes of an approaching object positioning process, a tag information acquisition process, and an operator identification process in this order (S110). The approaching object positioning process is a process of analyzing a captured image of a dangerous region and performing positioning of an object (a foreign object) having entered the dangerous region, i.e., identifying the current position CP of the operator P within the dangerous region. The tag information acquisition process is a process of analyzing a captured image of the dangerous region, identifying an ID indicated in the ID tag 30 present within the dangerous region, and performing positioning of the ID tag 30 (identification of an position of the ID tag 30). The operator identification process is a process of identifying the ID and the current position CP of the operator P by combining the current position CP of the foreign object (the operator P) identified in the approaching object positioning process and the ID and the position of the ID tag 30 identified in the tag information acquisition process. In the operator identification process, when ID=01 is indicated in the ID tag 30 identified at a position close to CP01 with respect to a foreign object (an operator P) having the current position CP=CP01, the foreign object (the operator P) is identified to be the operator P having ID=01. Details of the approaching object positioning process, the tag information acquisition process, and the operator identification process included in the image analysis process will be described below with reference to FIG. 5(A), FIG. 5(B) and FIG. 5(C).

(Detection Zone Setting Process)

The setting unit 120 acquires the ID of the operator P from the image processing unit 110 (S120). When there are a plurality of operators P within the dangerous region, the image processing unit 110 identifies the ID of each of the plurality of operators P. The setting unit 120 acquires the ID of each of the plurality of operators P from the image processing unit 110. Also, the setting unit 120 acquires the set reference information 210 with reference to the storage unit 200 (S130).

The setting unit 120 sets the detection zone DZ for each operator P from the ID of the operator P and the set reference information 210 (S140). The setting unit 120 stores the set "detection zone DZ for each operator P" as the set detection zone information 230 in the storage unit 200.

(Determination Process)

The determination unit 130 acquires a current position CP for each operator P (=region of a foreign object) from the image processing unit 110 (S150). The determination unit 130 acquires the set detection zone information 230 which is information about the detection zone DZ for each operator P with reference to the storage unit 200. The determination unit 130 determines whether or not the operator P is present within (or has entered) the detection zone DZ of the operator P for each operator P (S160).

When it is determined that "there is no operator P having entered the detection zone DZ set for the operator P" (No in S170), the safety controller 10 ends the process. When it is determined that "there is an operator P having entered the detection zone DZ set for the operator P" (YES in S170), the determination unit 130 notifies the output control unit 140 of a determination result.

The output control unit 140, which is notified of a determination result indicating that "there is an operator P having entered the detection zone DZ set for the operator P" from the determination unit 130, outputs a safety control signal to the controller 40 (S180). When the safety control signal is received from the output control unit 140, the controller 40 executes a safety control process such as stopping of the operation of the machine 20.

If it is determined that "there is an operator P having entered the detection zone DZ set for the operator P," the determination unit 130 identifies an operator P having entered the detection zone DZ set for the operator P (i.e., the ID of the operator P is acquired) (S190). The determination unit 130 notifies the notification control unit 150 of the acquired ID (the ID of the operator P having entered the detection zone DZ set for each operator P).

The notification control unit 150 notifies the operator P identified in step S190 that the safety control has been executed for the reason of entry of the operator P identified in S190 (entry into the detection zone DZ set for the operator P) (S200).

The process executed by the safety controller 10 described with reference to FIG. 4 can be summarized as follows. That is, the control method executed by the safety controller 10 is a method of controlling a safety control device for executing a safety operation when it is determined that an operator P has entered a detection zone DZ in a dangerous region including a region where an operation space of a machine 20 overlaps an operation space of the operator P, the method including: an acquisition step (S120) of acquiring an ID (identification information) of each of a plurality of operators P01, P02, and P101 simultaneously present within the dangerous region; a setting step (S140) of setting the detection zone DZ (the detection zone DZ01, DZ02, or DZ101) for each operator P whose ID is acquired in the acquisition step; and a position identification step (S150) of identifying a current position CP (a position) (i.e., the current position CP01, CP02, or CP101) of each of the plurality of operators P01, P02, and P101 whose IDs are acquired in the acquisition step in the dangerous region, wherein the safety operation is executed when at least one (e.g., the operator P02) of the plurality of operators P01, P02, and P101 whose IDs are acquired in the acquisition step enters the detection zone DZ (e.g., the detection zone DZ02) set for at least one operator (e.g., the operator P02) in the setting step.

According to the above-described method, in the control method, the detection zone DZ is set for each operator P, and the safety operation is executed when at least one of the plurality of operators P enters the detection zone DZ set for the at least one operator P. In the control method, for example, the detection zones DZ01, DZ02, and DZ101 are set for the three operators P01, P02, and P101. Then, in the above-described control method, the safety operation is executed when at least one (e.g., the operator P02) of the three operators P01, P02, and P101 enters a detection zone (e.g., the detection zone DZ02) set for the operator.

Here, for example, characteristics such as knowledge of an operation of the machine 20, details of an assigned operation, a skill level of an operation, and a body shape vary according to each operator. According to these characteristics, it can be assumed that the "distance from the machine 20 (i.e., the detection zone DZ)" necessary for performing the operation while sufficiently securing safety also varies. Specifically, an operator (e.g., the operator P01) who is familiar with the operation of the machine 20 and has a high skill level can perform the operation while sufficiently securing safety even if a distance from the machine 20 is somewhat short. On the other hand, an operator P (e.g., the operator P02) who does not have sufficient knowledge of the operation of the machine 20 and is unfamiliar with the operation is considered to need to be farther from the machine 20 in order to perform the operation while sufficiently securing safety.

Conventionally, the above-described characteristics of each operator who performs an operation are not considered with respect to a detection zone DZ for securing the safety of the operator (i.e., a distance from the machine 20) in the dangerous region where the operation space of the machine 20 overlaps the operation space of the operator P. Specifically, a detection zone DZ corresponding to the "distance from the machine 20" for securing safety to the utmost is set so that any operator P can perform an operation while sufficiently securing safety regardless of the above-described characteristics of each operator P who performs an operation conventionally. In other words, in the conventional method of controlling the safety control device, a safety operation is executed even when "an operator P (e.g., the operator P01) who is familiar with the operation of the machine 20 and has a high skill level of the operation" enters the detection zone DZ for securing the safety of "an operator P (e.g., the operator P02) who does not have sufficient knowledge of the operation of the machine 20 and is unfamiliar with the operation." Thus, there is a problem in that the conventional method of controlling the safety control device causes the machine 20 to be paused and causes an operation rate of the machine 20 to be decreased frequently.

According to the above configuration, in the control method illustrated in FIG. 4, each of the plurality of operators P is identified and the above-described detection zone DZ is set for each operator P. In the above-described control method, a position (a current position CP) of each of the plurality of operators P simultaneously present within the dangerous region is identified and the safety operation is executed when a certain operator P enters the detection zone DZ set for the certain operator P.

For example, in the control method illustrated in FIG. 4, different detection zones DZ (e.g., the detection zones DZ01 and DZ02) are set for "an operator (e.g., the operator P01) who is familiar with the operation of the machine and has a high skill level of the operation" and "any operator (e.g., the operator P02) who does not have sufficient knowledge of the operation of the machine and is unfamiliar with the operation." Thus, in the above-described control method, a safety operation is not executed when "an operator P (e.g., the operator P01) who is familiar with the operation of the machine and has a high skill level of the operation" enters the detection zone for securing the safety of "an operator P (e.g., the operator P02) who does not have sufficient knowledge of the operation of the machine and is unfamiliar with the operation." That is, because a safety operation is executed (e.g., the machine 20 is paused) only when it is necessary to secure the safety of the specific operator P in the above-described control method, a decrease in the operation rate of the machine 20 can be minimized.

Therefore, it is possible to set an optimum detection zone DZ for minimizing a decrease in an operation rate of a machine 20 while securing safety of an operator P for each operator P with respect to a plurality of operators P in the above-described control method. In other words, it is possible to execute an optimum safety operation for each operator P and minimize a decrease in an operation rate of the machine 20 even when a plurality of operators P having different characteristics such as knowledge of an operation of a machine 20, details of an assigned operation, a skill level of an operation, and a body shape are simultaneously present within the dangerous region in the above-described control method.

(Image analysis Process Executed by Safety Control Device)

FIG. 5(A), FIG. 5(B) and FIG. 5(C) are flowcharts illustrating an example of an image analysis process (an approaching object positioning process, a tag information acquisition process, and an operator identification process) executed by the safety controller 10. As described above, the image analysis process is a process of identifying an ID and a current position CP of an operator P in the dangerous region from a captured image of the dangerous region, and includes three processes of the approaching object positioning process, the tag information acquisition process, and the operator identification process in this order. Hereinafter, details of the three processes of the approaching object positioning process, the tag information acquisition process, and the operator identification process will be described with reference to FIG. 5(A), FIG. 5(B) and FIG. 5(C).

(Approaching Object Positioning Process)

The approaching object positioning unit 111 acquires a reference image (a captured image of a dangerous region at a time when the operator P is not present) from the photographing device 60 (S310). Also, the approaching object positioning unit 111 may acquire the reference image stored in advance in the storage unit 200 or the like. That is, the photographing device 60 may previously photograph a dangerous region at the time when the operator P is not present, and transmit the captured image as a reference image to the safety controller 10 or the like for saving. The approaching object positioning unit 111 may acquire the saved reference image.

The approaching object positioning unit 111 acquires a monitoring image (a currently captured image of the dangerous region. That is, the approaching object positioning unit 111 acquires a captured image of a dangerous region where the operator P is present) from the photographing device 60 (S320), and generates a difference image between the acquired reference image and the monitoring image (S330). The approaching object positioning unit 111 extracts a region (i.e., a current position CP) of a foreign object (i.e., an operator P) from the difference image generated in S330 (S340). The approaching object positioning unit 111 outputs the "region of the foreign object" extracted in S340, i.e., the current position CP of the operator P (in other words, a space region currently occupied by the operator P), to the operator identification unit 113 (S350).

As described above, the approaching object positioning unit 111 analyzes the captured image of the dangerous region and performs positioning of an object (a foreign object) having entered the dangerous region, i.e., identifies the current position CP of the operator P within the dangerous region. The approaching object positioning unit 111 notifies the operator identification unit 113 of the identified "current position CP of the operator P."

When operators P01, P02, and P101 are present in the dangerous region, the approaching object positioning unit 111 identifies the current positions CP01, CP02, and CP101 of the operators P01, P02, and P101. Then, the approaching object positioning unit 111 notifies the operator identification unit 113 that the operators P are present at the current positions CP01, CP02, and CP101.

Also, the approaching object positioning unit 111 may not identify that the operator P01 is at the current position CP01, that the operator P02 is at the current position CP02, and that the operator P101 is at the current position CP101. It is only necessary for the approaching object positioning unit 111 to analyze the captured image of the dangerous region and identify that "there is an operator P at each of the current positions CP01, CP02, and CP101," i.e., "three operators P are present at the current positions CP01, CP02, and CP101." Then, it is only necessary for the approaching object positioning unit 111 to notify the operator identification unit 113 that the operator P is present at each of the current positions CP01, CP02, and CP101.

The approaching object positioning unit 111 identifies the current positions CP01, CP02, and CP101 which are positions where the foreign object is detected and notifies the operator identification unit 113 of the identified current positions CP01, CP02, and CP101.

(Tag Information Acquisition Process)

The ID tag positioning unit 112 acquires a monitoring image (a currently captured image of the dangerous region, i.e., a captured image of the dangerous region where the operator P is present) from the photographing device 60 (S410). The ID tag positioning unit 112 extracts a feature point (i.e., an ID tag 30) with respect to the monitoring image acquired in S410 (S420) and extracts (acquires) an ID indicated in the ID tag 30 (S430). Various image analysis techniques have conventionally been known for a method of extracting the feature point from the image and acquiring information shown in the image and the ID tag positioning unit 112 uses these methods to extract (acquire) the ID indicated in the ID tag 30.

If the ID extraction has failed (NO in S440), the ID tag positioning unit 112 ends the process. If the ID extraction has succeeded (YES in S440), the ID tag positioning unit 112 performs positioning of the feature point (i.e., the ID tag 30), i.e., identifies a position of the feature point (S450). Then, the ID tag positioning unit 112 outputs a position (a coordinate position) of the feature point (i.e., the ID tag 30) identified in S450 and the ID of the ID tag 30 identified in S430 (the ID indicated in the ID tag 30) to the operator identification unit 113 (S460).

As described above, the ID tag positioning unit 112 analyzes the captured image of the dangerous region to identify the ID indicated in the ID tag 30 present in the dangerous region and perform positioning of the ID tag 30 (identification of the position of the ID tag 30).

(Operator Identification Process)

The operator identification unit 113 acquires "foreign object regions (i.e., the current positions CP01, CP02, and CP101 which are regions where foreign objects are currently present") from the approaching object positioning unit 111 (S510). The operator identification unit 113 acquires a coordinate position of the ID tag 30 and an ID of the ID tag 30 from the ID tag positioning unit 112 (S520).

The operator identification unit 113 determines whether or not the ID tag 30 is present within the "foreign object region" (S530). Specifically, it is determined whether or not the ID tag 30 is present within the current positions CP01, CP02, and CP101.

When it is determined that the ID tag 30 is present within the "foreign object region" (YES in S530), the operator identification unit 113 assigns an ID to the foreign object (S540), and a region (a current position CP) of the foreign object to which the ID is assigned is output to the determination unit 130 (S550).

For example, when the position of the ID tag 30(01) indicating ID=01 and the current position CP01 overlap (or are close to each other), the operator identification unit 113 assigns ID=01 to the current position CP01, i.e., assigns ID=01 to the operator P01 which is at the current position CP01. Then, the operator identification unit 113 outputs the current position CP01 to which the ID=01 is assigned, i.e., the current position CP01 associated with ID=01, to the determination unit 130.

Also, when the position of the ID tag 30(02) indicating ID=02 and the current position CP02 overlap (or are close to each other), the operator identification unit 113 assigns ID=02 to the current position CP02, i.e., assigns ID=02 to the operator P02 which is at the current position CP02. Then, the operator identification unit 113 outputs the current position CP02 to which the ID=02 is assigned, i.e., the current position CP02 associated with ID=02, to the determination unit 130.

When it is determined that the ID tag 30 is absent within the "foreign object region (=current position CP)" (NO in S530), the operator identification unit 113 determines that the ID is empty and the foreign object region (the current position CP) is output to the determination unit 130 (S560). For example, if there is no ID tag 30 present at a position overlapping the current position CP101 (or a close position), the operator identification unit 113 assigns "no ID" to the current position CP101, i.e., assigns "no ID" to the operator P101 at the current position CP101. Then, the operator identification unit 113 outputs the current position CP101 to which "no ID" is assigned, i.e., the current position CP101 associated with "no ID," to the determination unit 130.

The operator identification unit 113 combines the current position CP of the foreign object (the operator P) identified in the approaching object positioning process with the ID and the position of the ID tag 30 identified in the tag information acquisition process and identifies the ID and the current position CP of the operator P. The operator identification unit 113 notifies the determination unit 130 of the identified ID and the current position CP, i.e., the current position CP associated with the ID. Specifically, the operator identification unit 113 notifies the determination unit 130 of the current position CP01 associated with ID=01, the current position CP02 associated with ID=02, and the current position CP101 associated with "no ID."

(Example of Detection Zone set by Safety Control Device)

Figure 6:
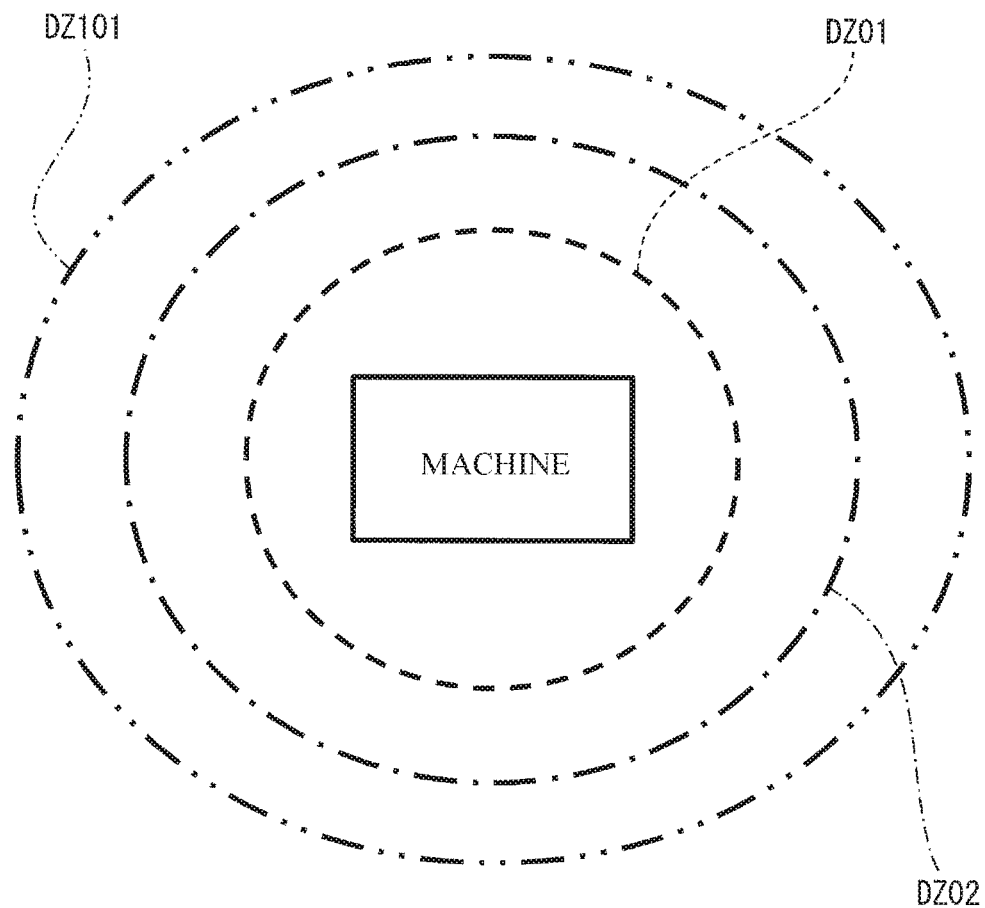
FIG. 6 is a diagram illustrating an example of a detection zone set for each operator by the safety controller of FIG. 1.

FIG. 6 is a diagram illustrating an example of the detection zone DZ set by the safety controller 10 for each operator P. In particular, FIG. 6 illustrates an example of the detection zones DZ01, DZ02, and DZ101 set by the setting unit 120 using the set reference information 210 and the detailed operator information 220 illustrated in FIG. 3(A) and FIG. 3(B). The setting unit 120, which is notified of "ID=01," "ID=02," and "no ID (i.e., ID=101)" from the image processing unit 110 with respect to the identification information of the foreign object (the operator P) present in the dangerous region, sets detection zones DZ01, DZ02, and DZ101 of FIG. 6.

The detection zone DZ01 is a detection zone DZ set by the setting unit 120 for "ID=01," i.e., for the operator P01 of "ID=01." The detection zone DZ02 is a detection zone DZ set by the setting unit 120 for "ID=02," i.e., for the operator P02 of "ID=02." The detection zone DZ101 is a detection zone set by the setting unit 120 for "no ID (in other words, ID=101)," i.e., for the operator P101 of "no ID (in other words, ID=101). Hereinafter, a method of setting the detection zone DZ by using the set reference information 210 and the detailed operator information 220 illustrated in FIG. 3(A) and FIG. 3(B) in the setting unit 120 will be described in detail.

The setting unit 120 associates "ID=01" with "skill level=expert" with reference to the set reference information 210 and the detailed operator information 220 of FIG. 3(A) and FIG. 3(B), and therefore sets a zone (a three-dimensional region) of "0.5 m from the machine 20" as the detection zone DZ01. The setting unit 120 associates "ID=02" with "skill level=beginner" with reference to the set reference information 210 and the detailed operator information 220 of FIG. 3(A) and FIG. 3(B), and therefore sets a zone (a three-dimensional region) of "1.0 m from the machine 20" as the detection zone DZ02. The setting unit 120 sets a zone (a three-dimensional region) of "1.5 m from the machine 20" for the detection zone DZ101 corresponding to "no ID" with reference to the set reference information 210 of FIG. 3(A).

(Example of Execution of Safety Control)

Figure 7:
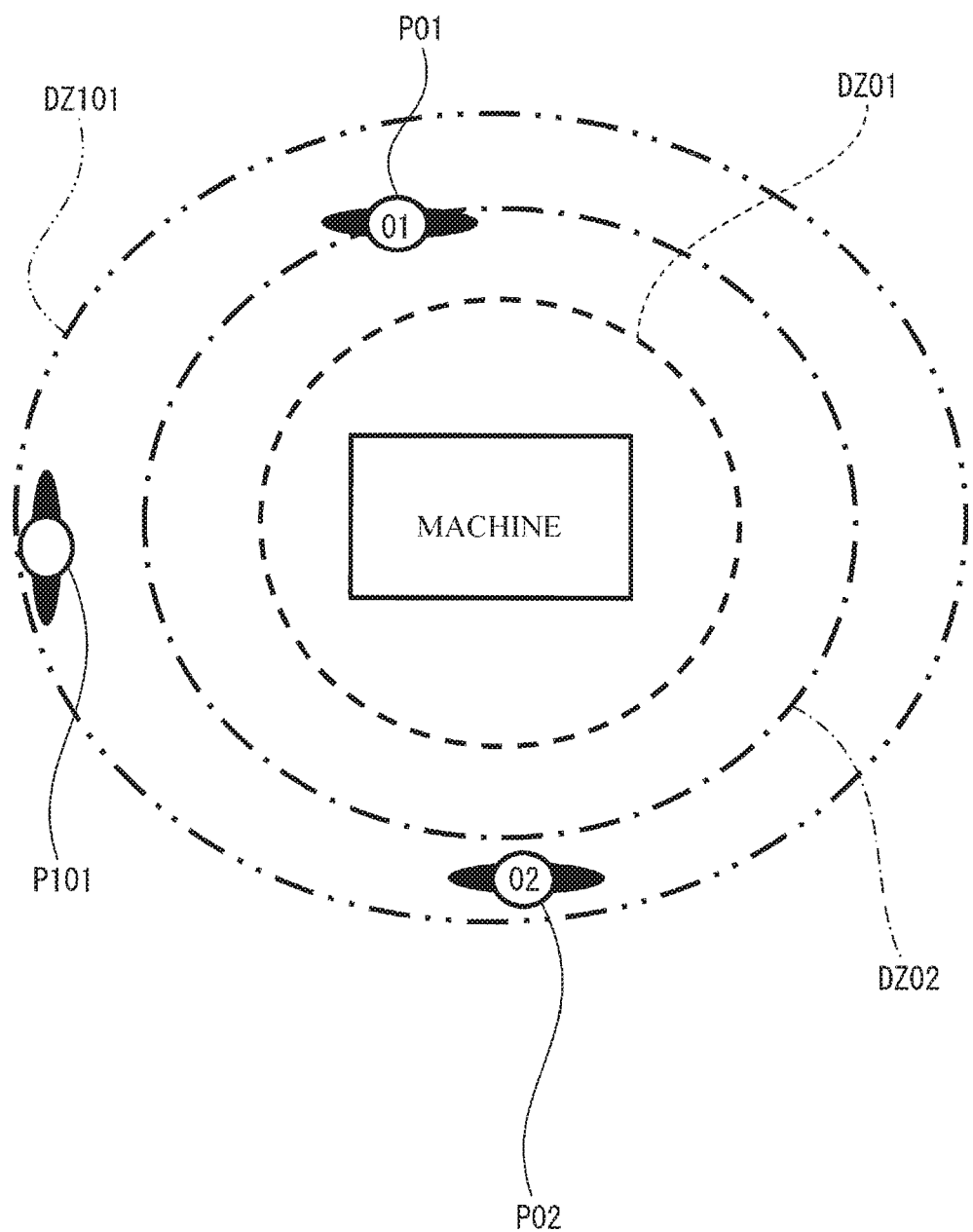
FIG. 7 is a diagram illustrating an example in which the safety controller of FIG. 1 executes safety control using the detection zone illustrated in FIG. 6.

FIG. 7 is a diagram illustrating an example in which the safety controller 10 executes the safety operation using the detection zone DZ illustrated in FIG. 6. In the example illustrated in FIG. 7, the operator P01 with ID=01 has entered the detection zone DZ101 for the operator P101 without an ID and has entered the detection zone DZ02 for the operator P02 with ID=02, but has not entered the detection zone DZ01 set for himself/herself. The operator P02 of ID=02 has entered the detection zone DZ101 for the operator P101 without an ID, but has not entered the detection zone DZ02 set for himself/herself. On the other hand, in the example illustrated in FIG. 7, the operator P101 without an ID has entered the detection zone DZ101 set for himself/herself.

In the example illustrated in FIG. 7, because one of the three operators P has entered the detection zone DZ set for the operator P, the safety controller 10 outputs a safety control signal (e.g., a signal for stopping the machine 20) to the controller 40. Specifically, the safety controller 10 determines that the operator P101 among the three operators P has entered the detection zone DZ101 set for the operator P101, and outputs a safety control signal to the controller 40. Also, the safety controller 10 notifies the operator P101 that the safety control process has been executed due to the operator P101.

(Modified Example of Detection Zone)

Figure 8:
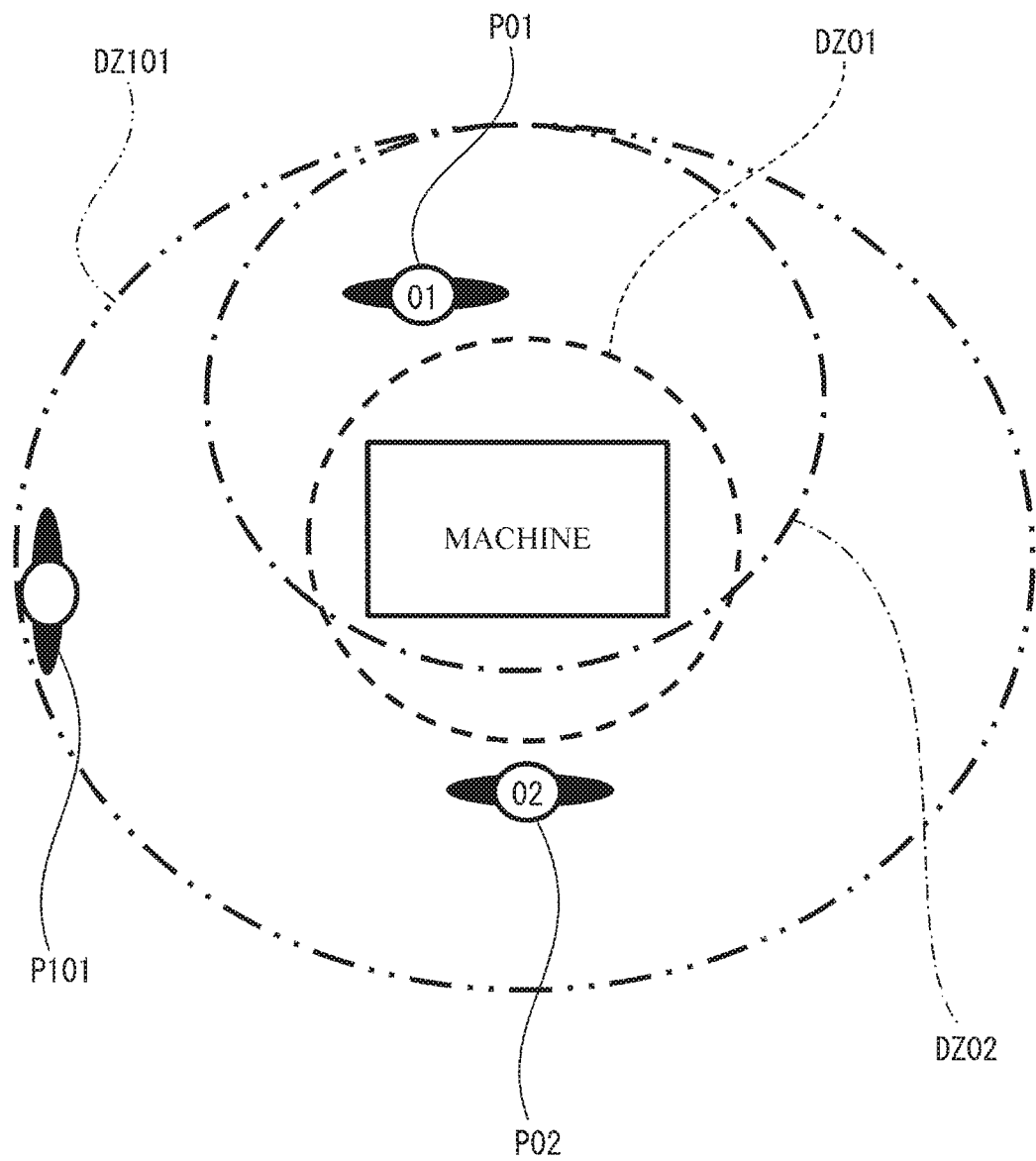
FIG. 8 is a diagram illustrating an example of a detection zone set by the safety controller of FIG. 1 for each operator different from the example illustrated in FIG. 6.

FIG. 8 is a diagram illustrating an example of a detection zone DZ set for each operator P by the safety controller 10 different from the example illustrated in FIG. 6. The detection zones DZ illustrated in FIG. 6 have been set concentrically from the machine 20 according to skill levels of a plurality of operators P. Specifically, the setting unit 120 sets the detection zone DZ02 for the operator P02 having "skill level=beginner" and the detection zone DZ101 for the operator P101 without an ID so that the distances from the machine 20 therein is larger than the distance from the machine 20 in the detection zone DZ01 for the operator P01 having "skill level=expert." Also, the setting unit 120 sets the detection zone DZ101 for the operator P101 without an ID so that the distance from the machine 20 therein is larger than the distance from the machine 20 in the detection zone DZ02 for the operator P02" having "skill level=beginner."

However, it is not indispensable that the setting unit 120 set the detection zone DZ for each operator P concentrically around the machine 20, and the setting unit 120 may set the detection zone DZ for each operator P non-concentrically around the machine 20 as illustrated in FIG. 8. In FIG. 8, an example of detection zones DZ01, DZ02, and DZ101 set by the setting unit 120 when an operation direction of the machine 20 is controlled so that it is a sheet upper side of the machine 20 around the machine 20 is illustrated. For example, the setting unit 120 sets the detection zones DZ01, DZ02, and DZ101 illustrated in FIG. 8 in accordance with the set reference information 210 defining setting of the detection zone DZ in accordance with the skill level and operation details. That is, the setting unit 120 non-concentrically sets the detection zone DZ01 for the operator P01 having "skill level=expert" and the detection zone DZ02 for the operator P02 having "skill level=beginner" who performs only an operation at a sheet lower side of the machine 20 around the machine 20.

As illustrated in FIG. 8, the setting unit 120 sets an optimum detection zone DZ02 for each operator P in accordance with characteristics such as details of an assigned operation, and a body shape as well as a skill level.

Other Modified Examples (Regarding ID Acquisition Method)

A method in which the safety controller 10 acquires an ID of an operator P from a captured image of a dangerous region, particularly, from an image obtained by imaging the ID tag 30 to which the ID (identification information) of the operator P is optically written, has been described above. However, it is not indispensable that the ID (identification information) of the operator P be optically written to the ID tag 30. The ID (identification information) of the operator P may be electrically (electronically) written to the ID tag 30. Specifically, the ID tag 30 may be a wireless tag such as a radio frequency identification (RFID) tag storing the ID of the operator P. The safety controller 10 may acquire the ID of the operator P by receiving a signal from the wireless ID tag 30 carried by the operator P and storing the ID of the operator P.

(Regarding Method of Identifying Positions of Operator and ID Tag)

A method in which the safety controller 10 acquires a current position CP of an operator P from a captured image of a dangerous region has been described above. However, it is not indispensable that the current position CP of the operator P be acquired from the captured image of the dangerous region and the safety controller 10 may acquire the current position CP of the operator P using, for example, the following method.

That is, the safety controller 10 may acquire the current position CP of the operator P from a wireless tag such as an RFID tag carried by the operator P. Because the conventional technology can be used as a method of calculating the current position of the wireless tag (=the current position CP of the operator P) by communicating with the wireless tag such as the RFID tag, details thereof will be briefly described.

When the ID tag 30 is a wireless tag, the safety controller 10 identifies the position of the ID tag 30 and the current position CP of the operator P carrying the ID tag 30 by wireless communication with the ID tag 30.

Also, the safety controller 10 may acquire the current position CP of the operator P from an electronic device by using a GPS function of the electronic device or the like carried by the operator P. The safety controller 10 can acquire the current position CP of the operator P by using any conventional method of calculating the position of the operator P in a factory or the like.

[Example of Implementation by Software]

Control blocks of the safety controller 10 (in particular, the image processing unit 110, the setting unit 120, the determination unit 130, the output control unit 140, the notification control unit 150, and the notification control unit 160) may be implemented by a logic circuit (hardware)

formed in an integrated circuit (IC chip) or the like or may be implemented by software using a central processing unit (CPU).

In the latter case, the safety controller 10 includes a CPU adapted to execute commands of programs which are software capable of implementing various functions, a read only memory (ROM) or a storage device (referred to as a recording medium) recording the programs and various data that can be read by a computer (or the CPU), a random access memory (RAM) for loading the programs, and the like. Moreover, the programs recorded in the recording medium can be read and executed by the computer (or the CPU) to achieve the disclosure. A "non-transitory physical medium," for example, a tape, a disk, a card, a semiconductor memory, a programmable logic circuit, or the like, can be used as the above-described recording medium. Also, the program can be provided to the above-described computer through any transmission medium (a communication network, a radio wave, or the like) capable of transmitting the program. Also, according to an embodiment of the disclosure, the data embodying the program and embedded in carriers can be implemented in form of signals through electronic transmission.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A safety control device for executing a safety operation when it is determined that an operator has entered a detection zone in a dangerous region including a region where an operation space of a machine overlaps an operation space of the operator, the safety control device comprising:
   an acquisition unit configured to acquire identification information of each of a plurality of operators simultaneously present within the dangerous region;
   a setting unit configured to set different detection zones respectively for each operator based on the corresponding identification information; and
   a position identification unit configured to identify a position of each of the plurality of operators whose identification information is acquired by the acquisition unit in the dangerous region,
   wherein the safety operation is executed when at least one of the plurality of operators whose identification information is acquired by the acquisition unit enters the detection zone set for the at least one operator by the setting unit.

2. The safety control device according to claim 1, wherein the acquisition unit acquires the identification information of the operator within the dangerous region by using at least one of an image obtained by photographing the dangerous region and a signal from a wireless tag storing the identification information of the operator that is a wireless tag carried by the operator.

3. The safety control device according to claim 2, further comprising a notification unit configured to notify the operator having entered the detection zone that the operator has entered the detection zone set for the operator when the operator whose identification information is acquired by the acquisition unit has entered the detection zone set for the operator by the setting unit.

4. The safety control device according to claim 3, further comprising a notification unit configured to notify the operator whose identification information is acquired by the acquisition unit of the detection zone set for the operator by the setting unit.

5. The safety control device according to claim 3, wherein the setting unit sets a three-dimensional detection zone by using a captured image of the dangerous region photographed by at least two cameras.

6. The safety control device according to claim 4,
   wherein the notification unit causes a wearable display terminal worn by the operator to display the detection zone set for the operator by the setting unit, and
   wherein the acquisition unit acquires the identification information of the operator from a tag in which the identification information of the operator is described that is a tag provided in the wearable display terminal.

7. The safety control device according to claim 2, further comprising a notification unit configured to notify the operator whose identification information is acquired by the acquisition unit of the detection zone set for the operator by the setting unit.

8. The safety control device according to claim 7,
   wherein the notification unit causes a wearable display terminal worn by the operator to display the detection zone set for the operator by the setting unit, and
   wherein the acquisition unit acquires the identification information of the operator from a tag in which the identification information of the operator is described that is a tag provided in the wearable display terminal.

9. The safety control device according to claim 2, wherein the setting unit sets a three-dimensional detection zone by using a captured image of the dangerous region photographed by at least two cameras.

10. The safety control device according to claim 1, further comprising a notification unit configured to notify the operator having entered the detection zone that the operator has entered the detection zone set for the operator when the operator whose identification information is acquired by the acquisition unit has entered the detection zone set for the operator by the setting unit.

11. The safety control device according to claim 10, further comprising a notification unit configured to notify the operator whose identification information is acquired by the acquisition unit of the detection zone set for the operator by the setting unit.

12. The safety control device according to claim 11,
   wherein the notification unit causes a wearable display terminal worn by the operator to display the detection zone set for the operator by the setting unit, and
   wherein the acquisition unit acquires the identification information of the operator from a tag in which the identification information of the operator is described that is a tag provided in the wearable display terminal.

13. The safety control device according to claim 10, wherein the setting unit sets a three-dimensional detection zone by using a captured image of the dangerous region photographed by at least two cameras.

14. The safety control device according to claim 1, further comprising a notification unit configured to notify the operator whose identification information is acquired by the acquisition unit of the detection zone set for the operator by the setting unit.

15. The safety control device according to claim 14,
   wherein the notification unit causes a wearable display terminal worn by the operator to display the detection zone set for the operator by the setting unit, and
   wherein the acquisition unit acquires the identification information of the operator from a tag in which the identification information of the operator is described that is a tag provided in the wearable display terminal.

16. The safety control device according to claim 15, wherein the setting unit sets a three-dimensional detection zone by using a captured image of the dangerous region photographed by at least two cameras.

17. The safety control device according to claim 14, wherein the setting unit sets a three-dimensional detection zone by using a captured image of the dangerous region photographed by at least two cameras.

18. The safety control device according to claim 1, wherein the setting unit sets a three-dimensional detection zone by using a captured image of the dangerous region photographed by at least two cameras.

19. A method of controlling a safety control device for executing a safety operation when it is determined that an operator has entered a detection zone in a dangerous region including a region where an operation space of a machine overlaps an operation space of the operator, the method comprising:

an acquisition step of acquiring identification information of each of a plurality of operators simultaneously present within the dangerous region;

a setting step of setting different detection zones respectively for each operator based on the corresponding identification information; and a position identification step of identifying a position of each of the plurality of operators whose identification information is acquired in the acquisition step in the dangerous region, wherein the safety operation is executed when at least one of the plurality of operators whose identification information is acquired in the acquisition step enters the detection zone set for the at least one operator in the setting step.

20. A non-transitory computer-readable recording medium storing an information processing program for causing a computer to execute the method according to claim 19.

* * * * *